United States Patent [19]
Aoki et al.

[11] Patent Number: 5,521,671
[45] Date of Patent: May 28, 1996

[54] CAMERA DISPLAY APPARATUS HAVING ROTATING ELEMENTS TO INDICATE PHOTOGRAPHIC INFORMATION

[75] Inventors: Hitoshi Aoki, Tokyo; Hiroshi Wakabayashi; Noboru Akami, both of Yokohama; Yuji Katano, Kawasaki; Daiki Tsukahara, Hiratsuka, all of Japan

[73] Assignee: Nikon Corporation, Japan

[21] Appl. No.: 533,213

[22] Filed: Sep. 22, 1995

Related U.S. Application Data

[63] Continuation of Ser. No. 309,606, Sep. 21, 1994, abandoned, which is a continuation of Ser. No. 115,130, Sep. 1, 1993, abandoned.

[30] Foreign Application Priority Data

| Sep. 2, 1992 | [JP] | Japan | 4-234829 |
| Sep. 3, 1992 | [JP] | Japan | 4-235709 |
| Sep. 11, 1992 | [JP] | Japan | 4-243775 |
| Sep. 14, 1992 | [JP] | Japan | 4-245139 |
| Oct. 16, 1992 | [JP] | Japan | 4-287813 |

[51] Int. Cl.⁶ ................................... G03B 17/00
[52] U.S. Cl. ........................................ 354/289.1
[58] Field of Search ................ 354/289.1, 289.11, 354/289.12, 465, 469, 470; 352/170, 172

[56] References Cited

U.S. PATENT DOCUMENTS

4,044,370  8/1977  Kondo ...................... 354/289.1

Primary Examiner—Howard B. Blankenship

[57] ABSTRACT

A display apparatus in a camera for displaying photographic information using rotating elements. The display apparatus includes a rotating setting dial to rotatively set photographic information, and a display unit including pointers and pointer scales to display the photographic information set by the rotating setting dial. The pointer rotates about a fixed pointer scale in order to indicate photographic information on the pointer scale as set by the rotating setting dial. The display apparatus further includes a detector to detect a direction of rotation of the rotating setting dial, a drive unit to rotate the pointer, and a control unit to control the drive unit to rotate the pointer in the same direction as the direction of the rotating setting dial detected by the detector. In addition, the display unit may include at least one pointer which is controlled by a stepping motor to rotate the pointer in only one direction, regardless of the direction of rotation of the rotating setting dial.

36 Claims, 22 Drawing Sheets

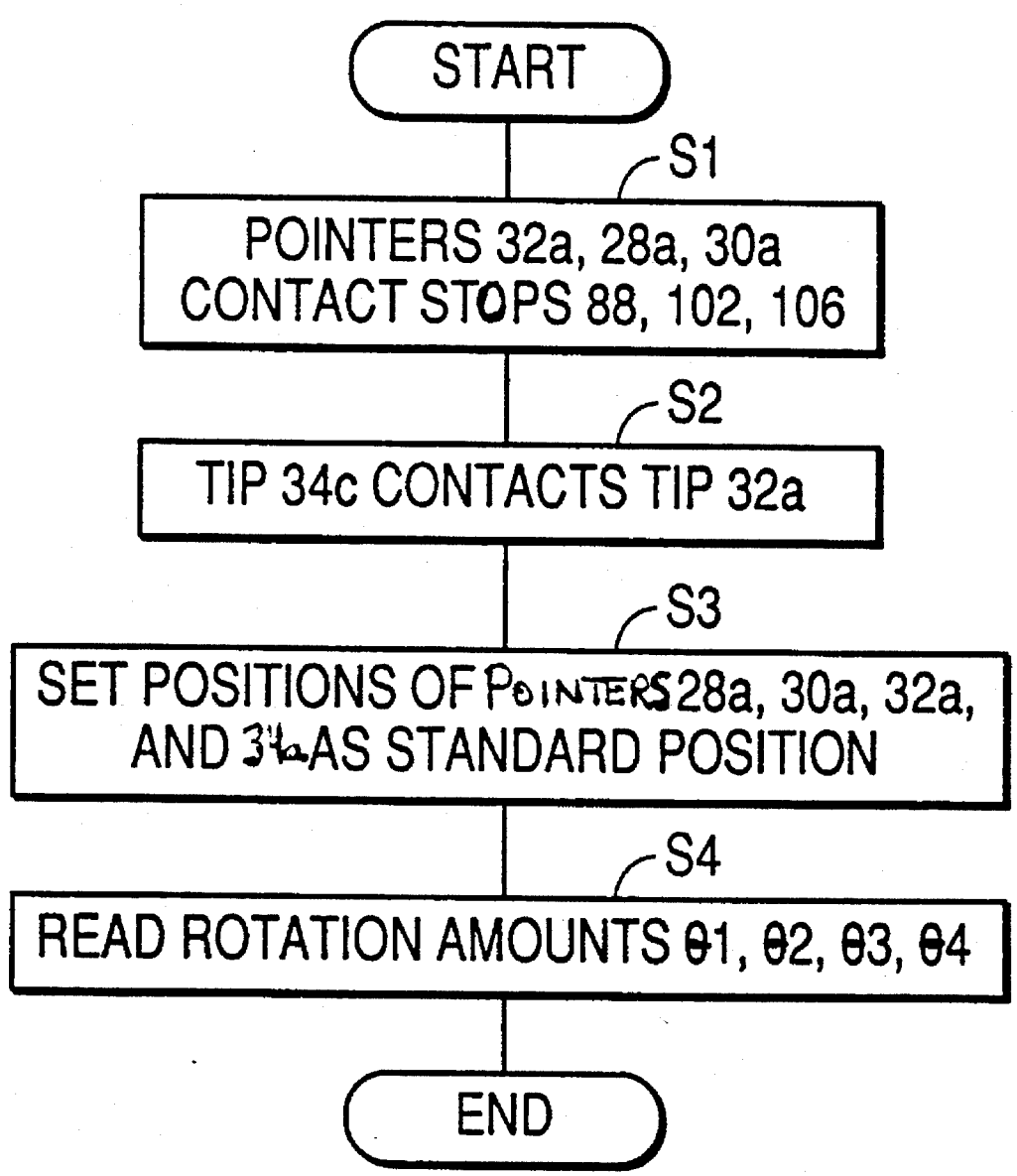

CAMERA DISPLAY APPARATUS HAVING ROTATING ELEMENTS TO INDICATE PHOTOGRAPHIC INFORMATION

This application is a continuation, of application Ser. No. 08/309,606, filed Sep. 21, 1994, now abandoned, which is a continuation of 08/115,130, filed Sep. 1, 1993, now abandoned.

BACKGROUND OF THE INVENTION

1. Field of the Invention

The present invention relates to a display apparatus, and more particularly, to a display apparatus in a camera having rotating elements for indicating photographic information.

2. Description of the Related Art

Conventional analog-type clocks have rotating hands that point to numbers on a scale to indicate time. Cameras have recently been manufactured which have a similar type of display device. For example, Japanese Patent Application 4-137225 teaches a display device, in a camera, having rotating pointers to indicate photographic information. The rotating pointers in the camera function similar to the rotating hands in an analog clock. In order to indicate information, such as a frame number or a stop value, pointers in the display device of the camera rotate above pointer scales containing the photographic information. The frame numbers or stop values are displayed on a circular-type scale. A pointer rotates above the scale and points to the correct information. A conventional camera also has a rotary-type setting dial for setting photographic information, such as shutter speed, stop values, and exposure correction values. The display device in the camera displays, using rotating pointers, the photographic information set by the dial.

The problem with this type of camera, however, is that the direction of rotation of the rotary-type setting dial is not always the same as the direction of rotation of the pointers in the display device. A pointer rotating counterclockwise and a dial rotating clockwise will most likely confuse a user of the camera, and make it more difficult to operate the camera.

In conventional analog-type clocks, stepping motors are used to drive the rotation of the hands. The stepping motors are small in size, highly reliable, and produced in large quantities at low cost. It is, therefore, desirable to use stepping motors to drive the rotating pointers in display devices of cameras. However, these conventional analog-clock stepping motors only rotate in one direction. The rotary-type setting dials in cameras can rotate in two directions, i.e., clockwise and counterclockwise. While it is desirable to use the small, reliable, less expensive stepping motors, they cannot rotate pointers in the same direction as the dial rotates. For example, when the dial is rotated in the counterclockwise direction, a clock stepping motor for rotating the pointer rotates the pointer in the clockwise direction. If one were to use a stepping motor to rotate a pointer in a camera, correct information could only be set while rotating the dial clockwise.

Furthermore, clocks do not automatically recognize the present position of its hands. A user is responsible for observing the position of the hands, and making appropriate adjustments upon the detection of a deviation from the correct time. In cameras, however, it is desirable for the camera to automatically recognize the present position of the pointers and to automatically correct for any discrepancies. Such discrepancies may occur, for example, by an external blow of force to the camera, causing the pointers to jump.

Drive mechanisms in clocks do not include detectors that recognize and correct the hand position. This is because such drive mechanisms would increase the cost, weight and size of the clocks. If a position detector switch, for example, were to be arranged in the clock to detect the position of the hands, the load on the drive device for the hands would increase, thereby decreasing the output of the stepping motor. It is difficult to drive the pointers with a weak output from the stepping motor. In order to increase the output, the stepping motor size would increase, the display device would thus become oversized, and its production cost would increase. Such a large and expensive drive motor, for recognizing and correcting pointer positions, is not desirable in a camera.

Instead of using such oversized and expensive drive mechanisms to recognize and correct pointer positions, display devices in cameras typically use stop elements. A stop is arranged at a prescribed position on a pointer scale to limit the rotation of a pointer. A standard position of the pointer is set to be the position of the pointer when it comes in contact with the stop. Then the pointer is driven to rotate from the standard position, and the amount of rotation from the standard position is detected and stored. Due to the stop, however, the pointer cannot continuously rotate in the same direction. A drive motor capable of both clockwise and counterclockwise rotation must be used to drive the rotation of the pointer. The small, reliable and less expensive stepping motor cannot, therefore, be used to drive the pointer.

Moreover, cameras having small display devices exist. In such a small display device, a small rotating pointer display unit is arranged within a large rotating pointer display unit to conserve space. However, sometimes the pointer in the large display unit overlaps the small display unit. This occurs when the pointer in the large display unit points to information near the small display unit. When this happens, it is difficult to set information in the small display unit because a user cannot see the small display unit.

SUMMARY OF THE INVENTION

It is therefore an object of the present invention to provide a display apparatus in a camera which can be easily operated by a user.

It is another object of the present invention to provide a camera display apparatus which has pointers that rotate in the same direction as the direction of rotation of a rotary-type setting dial.

It is a further object of the present invention to provide a camera display apparatus which is relatively small in size.

Yet a further object of the present invention is to provide a camera display apparatus which is relatively inexpensive, yet highly reliable.

Another object of the present invention is to provide a camera display apparatus which uses a stepping motor of unidirectional rotation to correctly rotate a pointer on a pointer scale, corresponding to a direction of rotation and an amount of rotation of a dial, regardless of whether the dial is rotated clockwise or counterclockwise.

It is yet a further object of the present invention to provide a camera display apparatus which uses stops to set pointers in a standard position and also uses a unidirectional stepping motor to rotate the pointers.

Another object of the present invention is to provide a camera display apparatus which uses stops to set pointers in a standard position in response to a reset signal and then automatically moves the pointers to their original positions existing before the reset signal was generated.

A further object of the present invention is to provide a small camera display apparatus which can be accurately and easily set by a user.

Yet a further object of the present invention is to provide a small camera display apparatus having a small display unit arranged within a larger display unit, which moves the large pointer away from the small display unit when the large pointer overlaps the small display unit.

The above objects are achieved by providing a display apparatus in a camera in a first embodiment which includes a rotating setting dial for rotatively setting photographic information, and a display unit, including at least one pointer scale and at least one pointer, for displaying the photographic information set by the rotating setting dial. The pointer scale includes the photographic information and the pointer indicates the photographic information by pointing to the photographic information set by the rotating setting dial. Either the pointer or the pointer scale rotates in the display unit in order to indicate the information set by the rotating setting dial. The display apparatus further includes a detector which detects a direction of rotation of the setting dial, a drive unit for rotating either the pointer or the pointer scale, and a control unit for controlling the drive unit to rotate either the pointer or the pointer scale in the same direction as the direction of the rotating setting dial detected by the detector.

In accordance with a second embodiment of the present invention, the display apparatus includes a rotating setting dial for rotatively setting photographic information while rotating in either a first or second direction, and a display unit, including at least one pointer and at least one pointer scale, for displaying the photographic information set by the rotating setting dial. The pointer scale includes photographic information and a first index and a second index. The pointer indicates the photographic information by pointing to the information set by the rotating setting dial. The pointer rotates in the first direction of rotation above the pointer scale. The apparatus further includes a drive unit to rotate the pointer in the first direction. The apparatus also includes a control unit which controls the drive unit to rotate the pointer in the first direction to point to the first index in the pointer scale when the rotating setting dial rotates in the first direction. The control unit also controls the drive unit to rotate the pointer in the first direction to point to the second index in the pointer scale when the rotating setting dial rotates in the second direction.

In accordance with a modification of the second embodiment of the present invention, a display apparatus includes a rotating setting dial for rotatively setting photographic information while rotating in a first or second direction, and a display unit, including at least one pointer and one pointer scale, for displaying photographic information set by the rotating setting dial. At least one pointer scale includes the photographic information and at least one pointer indicates the photographic information by pointing to the information set by the rotating setting dial. The pointer rotates in the first direction of rotation about the pointer scale. The apparatus further includes a drive unit to rotate the pointer in a first direction and a control unit which controls the drive unit to rotate the pointer in the first direction to a position on a pointer scale proportional to an amount and direction of rotation of the rotating setting dial when the rotating setting dial rotates in the first direction. The control unit also controls the drive unit to rotate the pointer in the first direction to a position on the pointer scale corresponding to an amount and direction of rotation of the rotating setting dial in the second direction when the rotating setting dial rotates in the second direction.

In accordance with a third embodiment of the present invention, a display apparatus includes a rotating setting dial for rotatively setting photographic information while rotating in either a first or second direction, a first display unit including a first pointer and a first pointer scale for displaying photographic information where the first pointer rotates above the first pointer scale, and a second display unit including a second pointer and a second pointer scale, for displaying the photographic information set by the rotating setting dial, where the second pointer rotates above the second pointer scale. The apparatus further includes a drive unit which rotates the first and second pointers, a stop element disposed at a predetermined position on the first pointer scale, which limits a rotation of the first pointer, and a control unit which controls the drive unit to initially rotate the first pointer to contact the stop element on the first pointer scale, then controls the drive unit to initially rotate the second pointer to contact the first pointer, and then sets a position of the initially rotated first pointer as a first standard position and the position of the initially rotated second pointer as a second standard position.

In accordance with a fourth embodiment of the present invention, a display apparatus includes a rotating setting dial for rotatively setting photographic information, a first display unit including a first pointer and a first pointer scale, for displaying photographic information set by the rotating setting dial where the first pointer rotates above the first pointer scale, and a second display unit including a second pointer and a second pointer scale, for displaying the photographic information set by the rotating setting dial, where the second pointer rotates above the second pointer scale. The second display unit is disposed within the first display unit within a range of rotation of the first pointer. The apparatus further includes a drive unit for rotating the first and second pointers, a detection unit for detecting when the first pointer overlaps the second display unit, and a control unit for controlling the drive unit to rotate the first pointer out of the range of the second display unit when the rotating setting dial sets photographic information displayed in the second display unit and when the detector detects that the first pointer overlaps the second display unit, and then controls the drive unit to rotate the first pointer back to its previous position after the rotating setting dial sets the information in the second display unit.

In accordance with a fifth embodiment of the present invention, a display apparatus includes a rotating setting dial for rotatively setting photographic information, a display unit including pointers and pointer scales, for displaying the information set by the rotating setting dial, where the pointer rotates above the pointer scale, and a drive unit for rotating the pointer. The apparatus further includes a stop element disposed at a predetermined position on the pointer scale which limits a rotation of the pointer, integrating unit for integrating a total amount of rotation of the pointer from the predetermined position of the stop element, and a memory which stores the integrated total amount. The apparatus also includes a display reset unit which generates a display reset signal, and a control unit which controls the drive unit to rotate the pointer in a first direction, and in response to the display reset signal, the control unit controls the drive unit to rotate the pointer in a second direction to the stop element and then in the first direction to a position on the pointer scale corresponding to the integrated total amount stored in the memory.

BRIEF DESCRIPTION OF THE DRAWINGS

These and other objects and advantages of this invention will become apparent and more readily appreciated from the following description of the preferred embodiments, taken in conjunction with the accompanying drawings, of which:

FIG. 16 is a flowchart illustrating a standard position recognition process program in accordance with the third embodiment of the present invention.

DETAILED DESCRIPTION OF THE PREFERRED EMBODIMENTS

Figure 1:
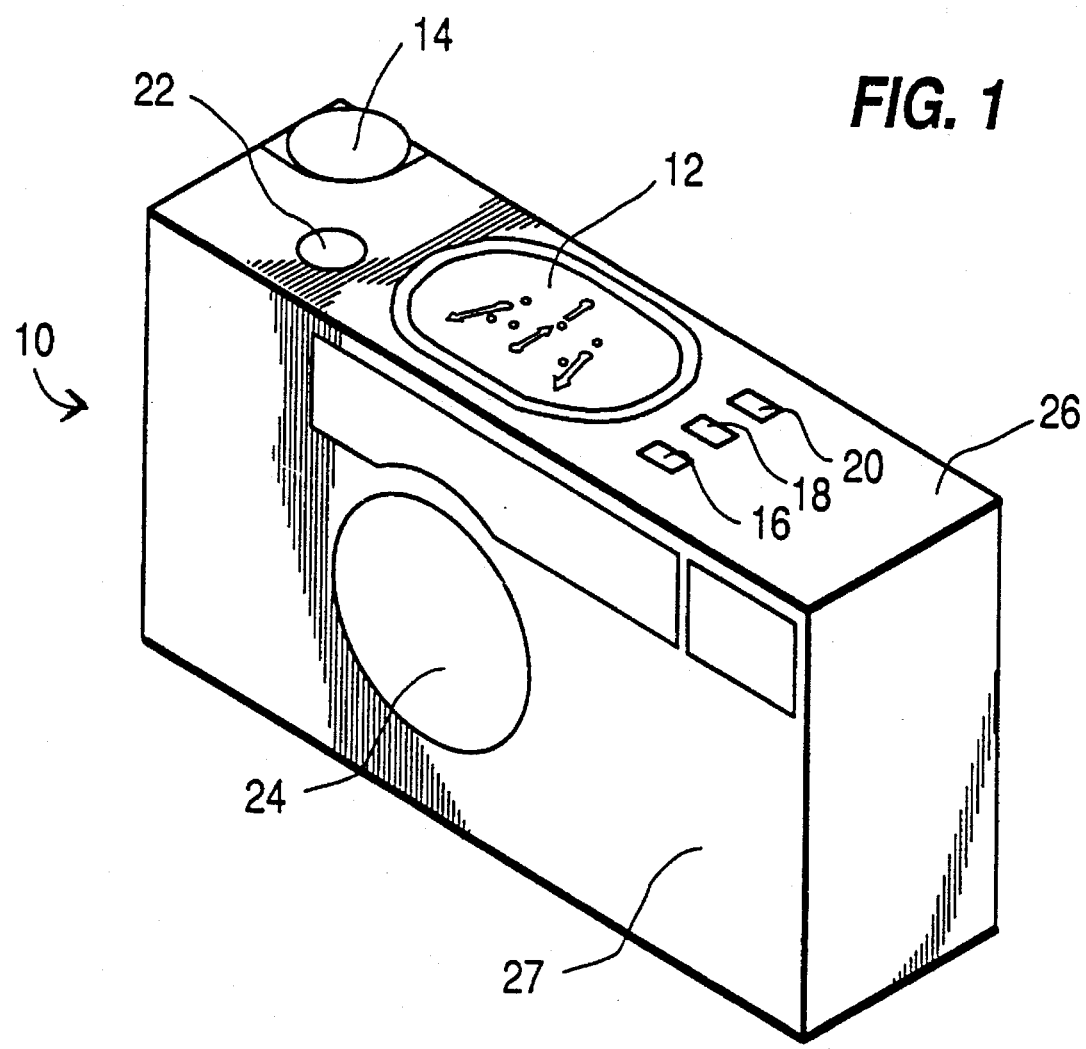
FIG. 1 is a perspective frontal view of a camera having a display apparatus in accordance with a first embodiment of the present invention.

FIG. 1 shows a first embodiment of a display apparatus in a camera, in accordance with the present invention. Camera 10 includes the display apparatus which is described in more detail below. Arranged on a top surface 26 of camera 10 is a display device 12, having four revolving pointer-type display units, a rotary-type dial 14 used to set various photographic information, selection button 16, 18 and 20 used to select various photographic modes, and a shutter release button 22. A photographic lens 24 is located on a front surface 27 of camera 10.

Figure 2:
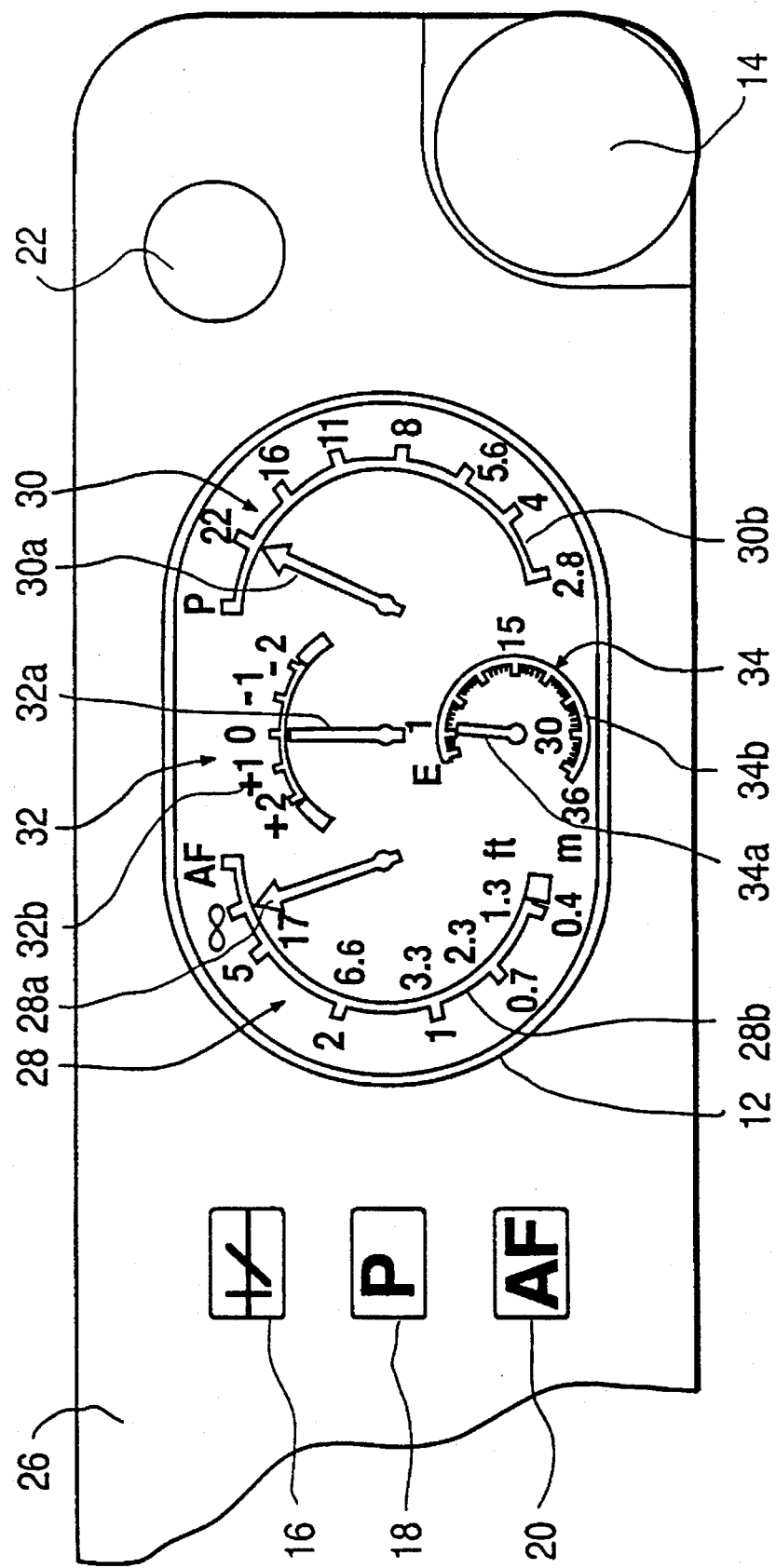
FIG. 2 is a view of the top surface of the camera in accordance with the first embodiment of the present invention.

FIG. 2 is an enlarged view of the camera top surface 26. The display device 12 is equipped with a focal distance display unit 28 to display the focal distance of photographic lens 24, a stop value display unit 30 to display a stop value, an exposure correction value display unit 32 to display an exposure correction value, and a frame number display unit 34 to display a frame count. An exposure correction selection button 16 is used to select an exposure correction mode. When the dial 14 is rotated while pressing selection button 16, a pointer 32a of the exposure correction value display unit 32 rotates in the range of +2 to −2 on a scale 32b. A stop value selection button 18 is a button used to select a stop value. When the dial 14 is rotated while pressing selection button 18, a pointer 30a of stop display unit 30 rotates in the range of P to 2.8 on a scale 30b. The symbol P denotes an automatic stop setting mode in which the camera automatically sets an optimum stop value. A focusing selection button 20 is a button used to select a focusing mode of the photographic lens 24. When the setting dial 14 is rotated while pressing selection button 20, a pointer 28a of focal distance display unit 28, linked to the focusing of photographic lens 24, rotates in the range of 0.4 m to AF and 1.3 ft to AF on scale 28b. The ∞ symbol donates the infinity position, and the symbol AF donates an autofocus mode, in which focusing of the photographic lens 24 is automatically performed based on a result of detection of a focus by a photodetection device (not shown). The frame number display unit 34 displays the film count, with a pointer 34a moving clockwise about a scale 34b.

Figure 3:
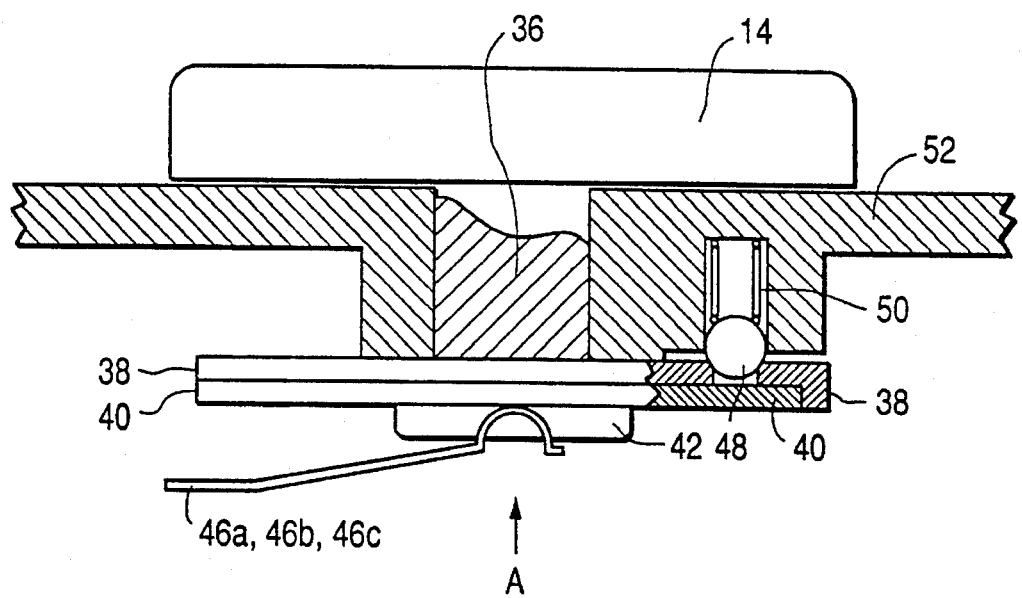
FIG. 3 is a cross-sectional view of a rotary setting dial of the camera in accordance with the first embodiment of the present invention.

FIG. 3 shows a structure of rotary setting dial 14. Dial 14 includes shaft 36. Mutually adhered click plate 38 and signal plate 40 are fixed to shaft 36 by a stop screw 42. Click plate 38 and symbol plate 40 rotate when the dial 14 is rotated. 52 is a camera cover, 50 is a spring, 48 is a ball, and 46a, 46b and 46c are brushes. These elements will be further explained below with reference to FIG. 4.

Figure 4:
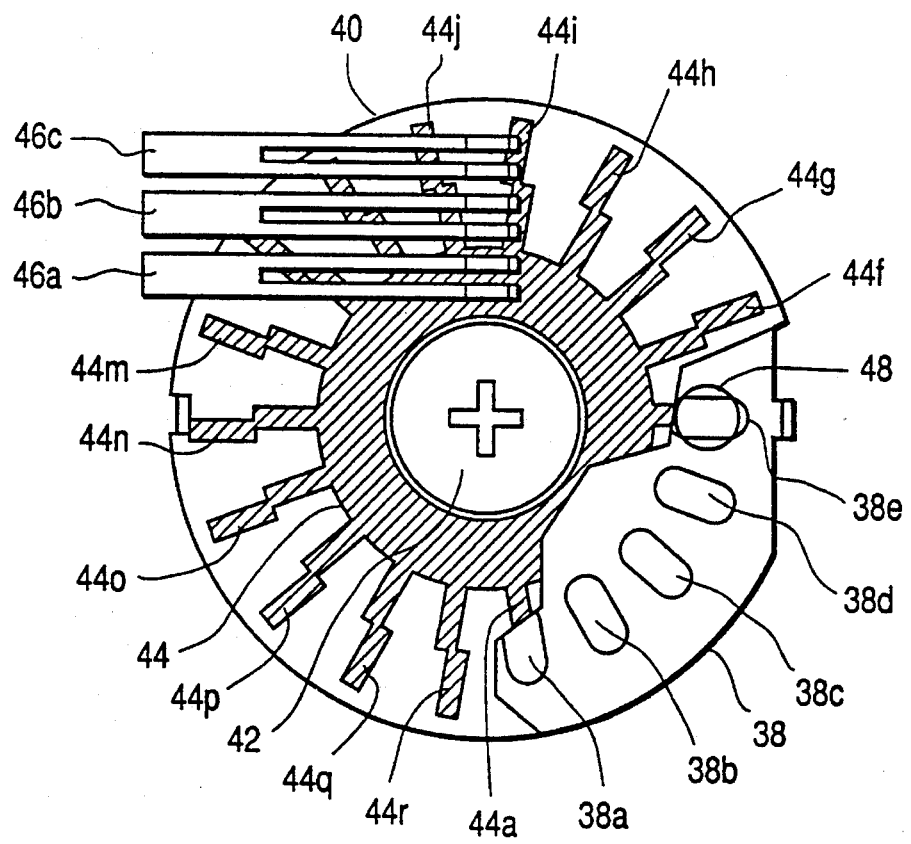
FIG. 4 is a view of an internal structure of the rotary setting dial in accordance with the first embodiment of the present invention.

FIG. 4 is a view of dial 14 from the direction A illustrated on FIG. 3. A conductive pattern 44 is arranged on signal plate 40. Brushes 46a, 46b and 46c perform a selection motion on pattern 44. The pattern is configured such that even if signal plate 40 makes one rotation against brush 46a, brush 46a normally contacts pattern 44. On the other hand, for brushes 46b and 46c, the pattern is configured such that brushes 46b and 46c contact pattern 44 according to prescribed rotation angles on signal plate 40. When signal plate 40 rotates in a clockwise direction, corresponding to a counterclockwise direction according to FIG. 4 because setting dial 14 is viewed from the rear, brush 46c contacts pattern 44 before brush 46b contacts pattern 44. The brush 46c is thereby short-circuited through brush 46a and pattern 44. In contrast, when signal plate 40 rotates in a counterclockwise direction, corresponding to a clockwise direction according to FIG. 4 because setting dial 14 is viewed from the rear, brush 46b contacts pattern 44 before brush 46c contacts pattern 44. Brush 46b is thereby short-circuited through the brush 46a and pattern 44. The detection of the direction of rotation of rotary dial 14 is based on the short-circuiting of brush 46a to whichever of brushes 46b and 46c contacts pattern 44 first.

Holes 38a–r (FIG. 4 only shows holes 38a, 38b, 38c, 38d and 38e) are arranged in click plate 38, in positions on the circumference of click plate 38 corresponding to conductive pattern sections 44a–44r, which are arranged in a radiating form from the center for contact with brushes 46b and 46c. Ball 48 and spring 50 are arranged on camera cover 52, and ball 48 is urged by spring 50 against a side of click plate 38. Click plate 38 rotates, accompanying the rotating action of dial 14, and ball 48 drops into the holes 38a–38r. At this time, dial 14 is stationary, and brushes 46b and 46c do not contact pattern 44. The dial 14 is able to rotate by overcoming the compressive force of spring 50, and ball 48 slips out of holes 38a–38r.

Figure 5:
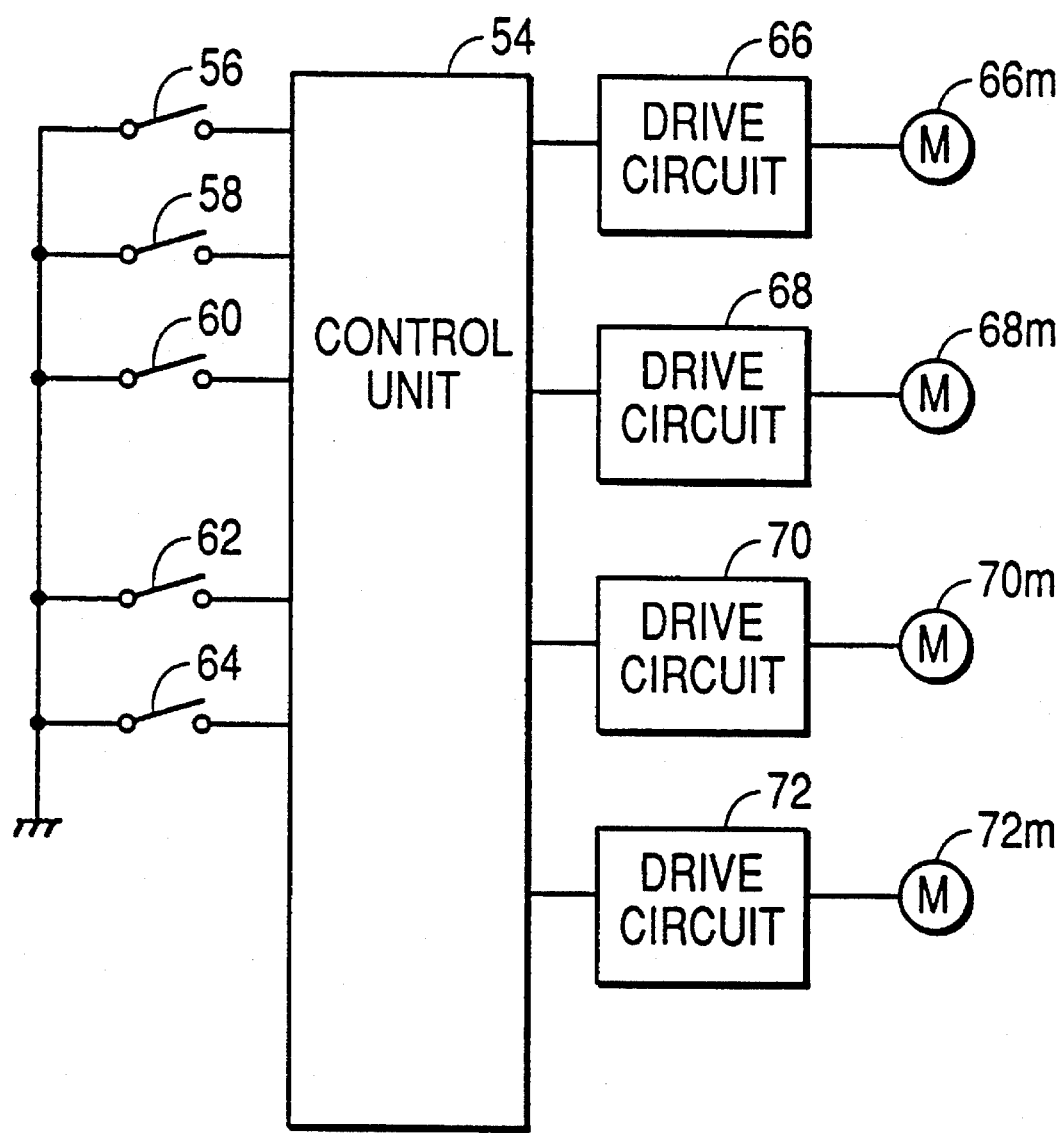
FIG. 5 is a block diagram showing an operation of the display apparatus in accordance with the first embodiment of the present invention.

FIG. 5 is a block diagram showing the operation of function buttons 16, 18, 20 and 22 in conjunction with dial 14 and display device 12, in accordance with the display apparatus of the first embodiment. Control unit 54 includes a microcomputer and its peripheral components. Control unit 54 performs control of various operations and sequences in the camera, and in addition, performs display control of display device 12, executing a control program. Switch 56 is closed upon pressing selection button 16. Switch 58 is closed upon pressing selection button 18. Switch 60 is closed upon pressing selection button 20. Switch 62 corresponds to the switch formed by brushes 46a and 46b and conductive pattern 44. When brushes 46a and 46b are short-circuited through pattern 44, switch 62 is closed. Switch 64 corresponds to the switch formed by brushes 46a and 46c and conductive pattern 44. When brushes 46a and 46c are short-circuited through pattern 44, switch 64 is closed.

Drive circuit 66 drives a motor 66m which causes pointer 28a of focal distance display unit 28 to rotate. Drive circuit 68 drives a motor 68m which causes pointer 30a of stop display unit 30 to rotate. Drive circuit 70 drives a motor 70m which causes pointer 36a of exposure correction value display unit 32 to rotate. Drive circuit 72 drives a motor 72m which causes pointer 34a of frame number display unit 34 to rotate. Motors 66m, 68m, 70m and 72m are reversible, dedicated drive motors.

Figure 6:
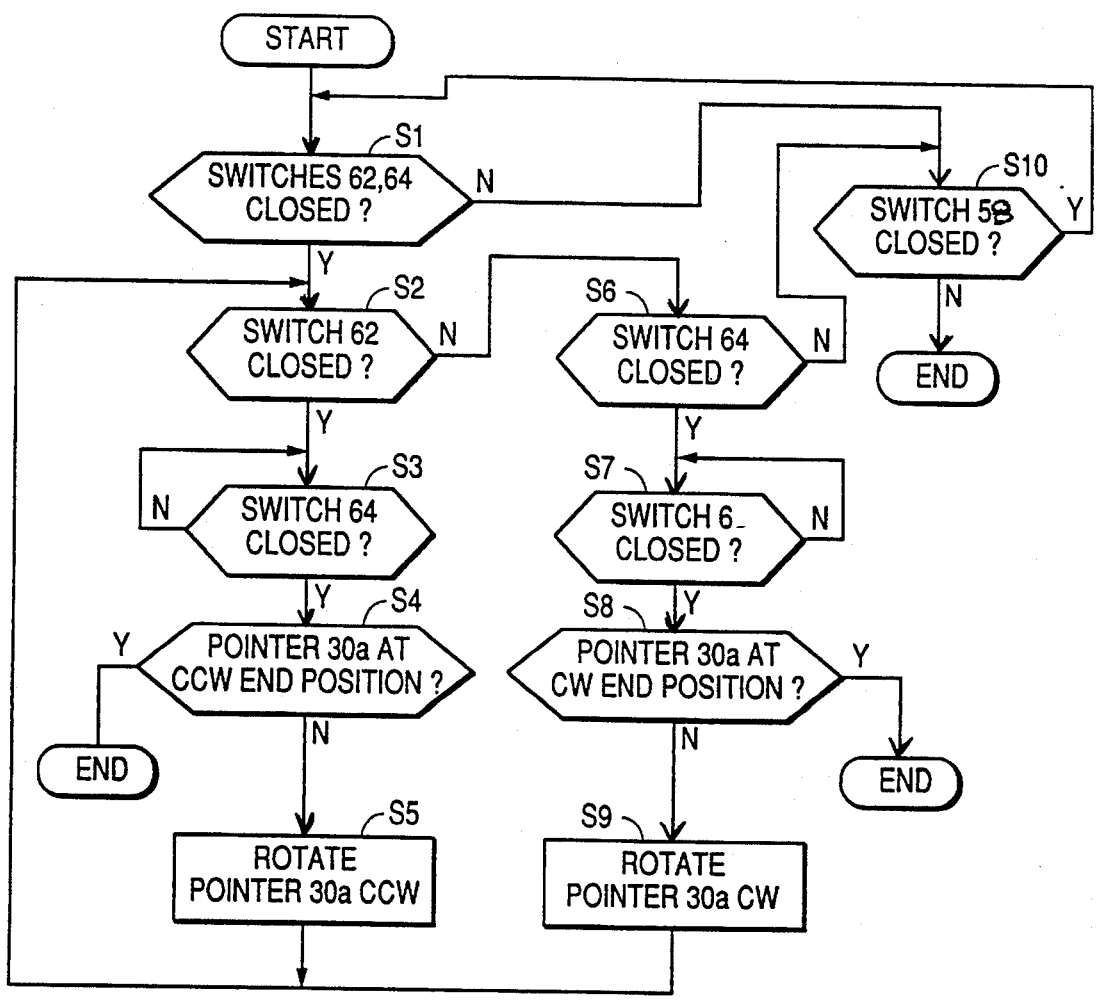
FIG. 6 is a flowchart illustrating a display control program of the first embodiment of the present invention.

FIG. 6 is a flowchart showing an example of a display control program in the stop setting mode. When selection button 18 and interlinked switch 58 are closed, control unit 54 initiates the display control program. First, in step S1, it is determined whether or not switches 62 and 64 are closed. In other words, it is determined whether or not setting dial 14 is being rotated. Normally, setting dial 14 is stationary, and in the state in which ball 48 has fallen into one of the holes 38a–38r. If setting dial 14 is stationary, brushes 46b and 46c are not in contact with pattern 44, and switches 62 and 64 are open. When setting dial 14 rotates, however, brushes 46b and 46c contact pattern portions 44a–44r and switches 62 and 64 are closed.

Having detected the rotation of setting dial 14, the program proceeds to step S2 to determine a direction of rotation. If, however, there is no rotation, the program proceeds to step S10. In step S2, it is determined whether or not switch 62 is closed. If switch 62 is closed, the program proceeds to step S3. If, however, switch 62 is not closed, the program proceeds to step S6. It is determined in step S3 whether or not switch 64 is closed. If switch 64 is closed, the program proceeds to step S4. At this point, the setting dial 14 is determined to have rotated in the counterclockwise ("CCW") direction. It is determined in step S6 whether or not switch 64 is closed. If switch 64 is closed, the program proceeds to step S7. If switch 64 is not closed, the program proceeds to step S10. It is determined in step S7 whether or not switch 62 is closed. If switch 62 is closed, the program proceeds to step S8. At this point, it is determined that setting dial 14 has rotated in the clockwise ("CW") direction.

When setting dial 14 rotates in a counterclockwise direction, it is determined in step S4 whether or not pointer 30a of stop display unit 30 is in the end position P in the counterclockwise ("CCW") direction. When pointer 30a is driven to rotate, its amount of rotation and direction of rotation is placed in a memory in control unit 54. The present position of pointer 30a is also stored in the memory. The present position may determine whether or not it is in the end position in a clockwise or counterclockwise direction. If pointer 30a is in the end position in the counterclockwise direction, pointer 30a is not driven to rotate any further, and execution of the program ends. If, however, pointer 30a is not in the end position P, the program advances to step S5. The drive circuit 68 is controlled so that motor 68m is driven to rotate pointer 30a counterclockwise, and pointer 30a is made to rotate only one division in the counterclockwise direction. Then, the program returns to step S2.

When setting dial 14 is rotated in the clockwise direction, in step S8 it is determined whether or not pointer 30a of stop display unit 30 is in the end position of 2.8. If pointer 30a is in the end position 2.8, the execution of the program ends. If, however, pointer 30a is not in the end position 2.8, the program proceeds to step S9. The drive circuit 68 is controlled such that the motor 68*m* is driven to rotate pointer 30*a* in a clockwise direction. The pointer 30*a* is rotated clockwise by only 1 division. After this, the program returns to step S2.

Regardless of whether the stop setting mode is set by selection button 18 when setting dial 14 is not rotated, in step S10 it is determined whether switch 58 is closed. Namely, it is determined whether or not the stop setting mode selection button 18 which was actuated is unchanged. If switch 58 is closed, the program returns to step S1. If switch 58 is not closed, the execution of the program ends.

In the case in which selection button 16 is actuated to select the exposure correction mode, or also in the case in which selection button 20 was actuated to select the focusing mode, control programs similar to the one illustrated in FIG. 6 are executed. Accordingly, pointer 32*a* of exposure correction value display unit 32 and pointer 28*a* of focal distance display unit 28 are rotated in the same direction as the direction of rotation of setting dial 14. A description of these control programs and operations is omitted, because it is similar to the one discussed for FIG. 6. After taking a photograph, pointer 34*a* of frame number display unit 34 is driven to rotate one frame division in a clockwise direction by means of drive circuit 72 and motor 72*m*. When the film is rewound after completion of photography, it is driven to rotate in a counterclockwise direction on scale 34*b* to position E. The direction of rotation of setting dial 14 is easily detected according to the first embodiment of this invention. Because the rotation of the pointer on the pointer scale is in the same direction as the direction of rotation of dial 14, the setting information can be easily and quickly set by looking at the pointer on the display device.

The display device 12 of the first embodiment has been described above as having mechanical means to rotate the pointer above the pointer scale. However, an electrical type of display device may be used in which an image of a pointer scale and pointer is displayed on an LCD or the like display unit. In this case, upon a rotary operation of the setting dial, the image of the pointer is rotated corresponding to the direction and amount of rotation of the setting dial. Furthermore, the display device has been described above first where a pointer rotates above a fixed pointer scale to display photographic information. However, the pointer may be fixed and the pointer scale may be arranged to rotate about the pointer. In this case, the pointer scale is rotated in the same direction as the direction of rotation of the setting dial.

Figure 7:
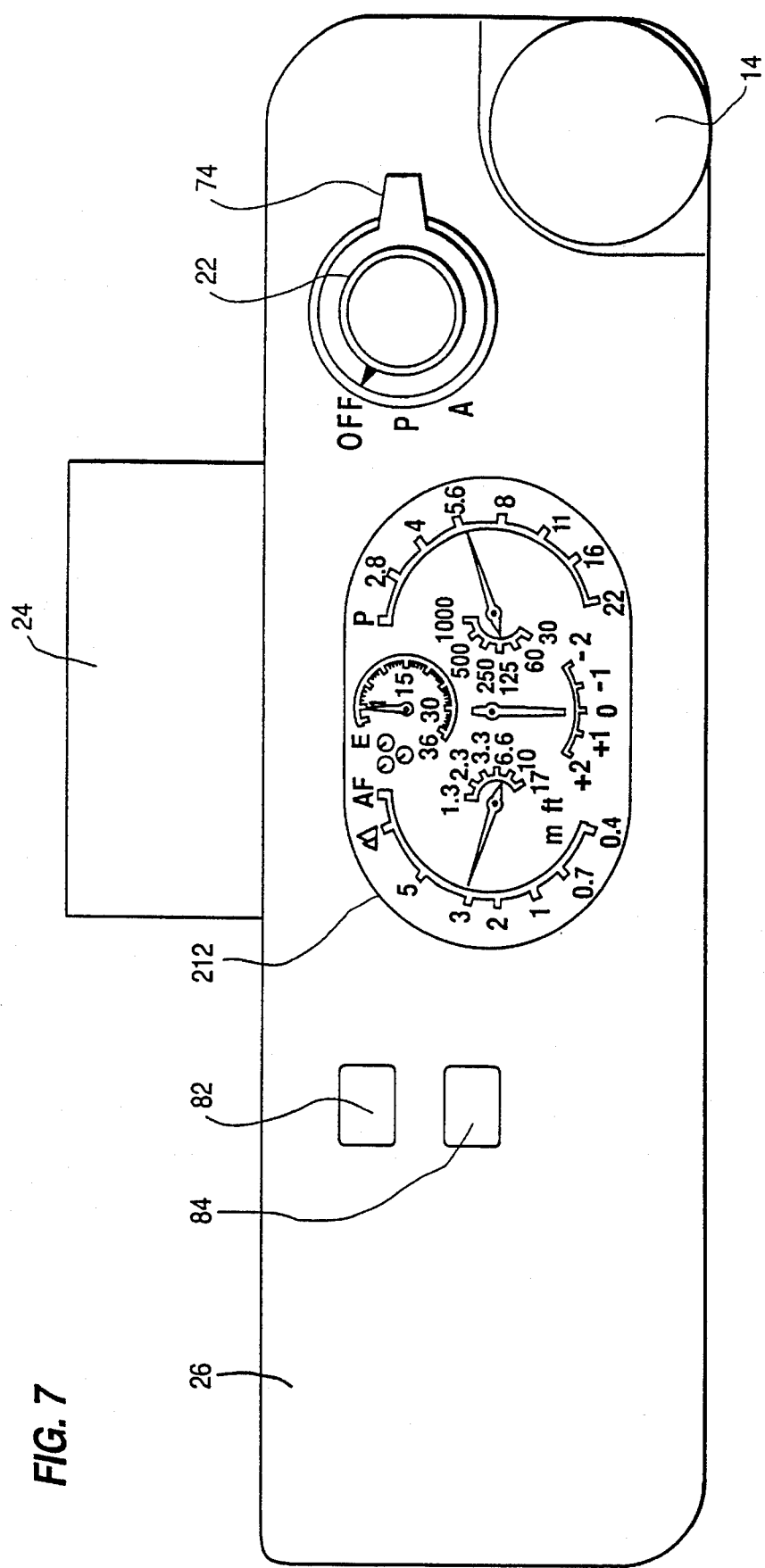
FIG. 7 is a view of a top surface of a camera including a display apparatus in accordance with a second embodiment of the present invention.

FIG. 7 shows a second embodiment of a display apparatus in a camera, in accordance with the present invention. Like elements in the figures of the first and second embodiments have like reference numerals. Located on top surface 26 of camera 10 are shutter release button 22, a photographic mode selector 74, rotary dial 14, a self-timer mode button 82, a strobe mode button 84, and a display unit 212.

Figure 8:
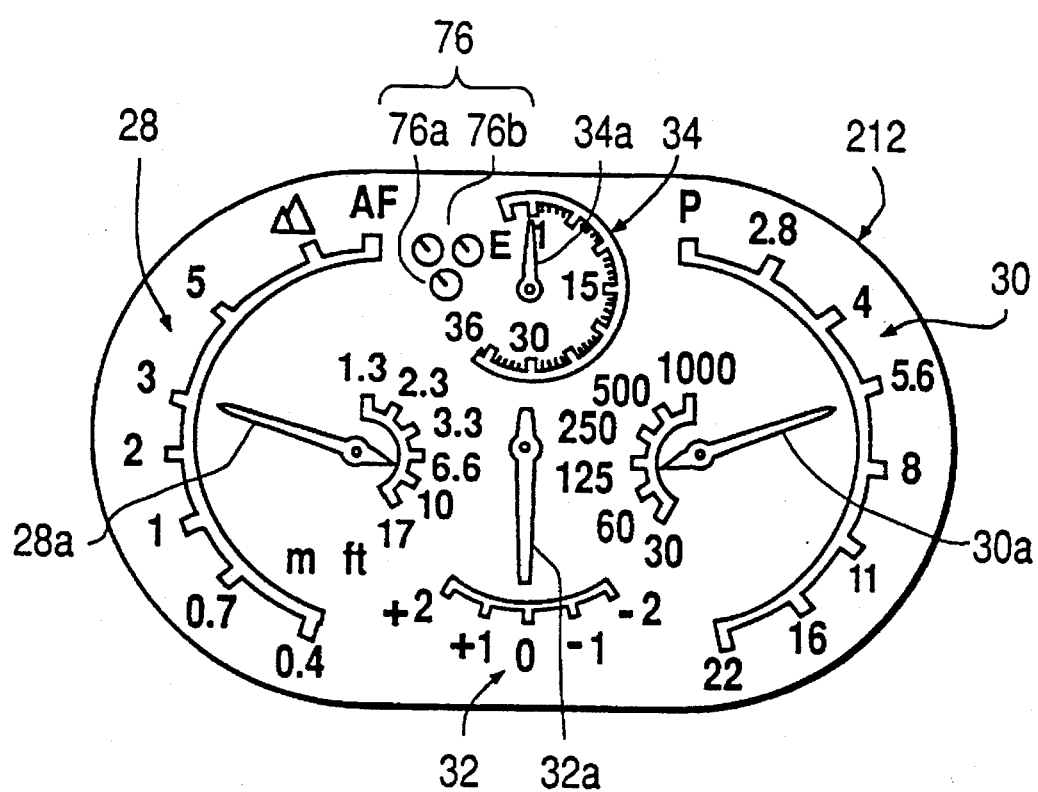
FIG. 8 is a view of a display device of the display apparatus in accordance with the second embodiment of the present invention.

FIG. 8 shows the display unit 212 of the second embodiment in more detail. Display unit 212 includes stop display unit 30, focal distance display unit 28, exposure correction value display unit 32, frame number display unit 34 and self-timer mode display unit 76. Stop value display unit 30 displays a stop value using pointer 30*a*. Focal distance display unit 28 displays a photographic distance using pointer 28*a*. Exposure correction display unit 32 displays an exposure correction value using pointer 32*a*. Pointers 28*a*, 30*a* and 32*a* of display units 28, 30 and 32, respectively, are driven by reversible, dedicated drive motors 66*m*, 68*m* and 70*m*, respectively. The motors are driven to rotate in the same direction as the direction of rotation of command dial 14, similar to the display apparatus of the first embodiment. The drive motors set pointers 28*a*, 30*a* and 32*a* in a position proportional to an amount of rotation of command dial 14.

The frame number display unit 34 displays the photographic frame number using a pointer 34*a*. The self-timer mode display unit 76 uses index 76*a* to display a single self-timer mode, and uses index 76*b* to display a double self-timer mode. Pointer 34*a* is driven to rotate in a clockwise direction only, by a stepping motor 72*m'* used in conventional clocks (see FIG. 9). Pointer 34*a* indicates both a frame number in frame number display unit 34 and a self-timer mode in self-time display unit 76. When self-timer mode button 82 is depressed while rotating dial 14, pointer 34*a* points to either index 76*a* or 76*b*, depending upon the direction of rotation of dial 14. Since pointer 34*a* is driven by stepping motor 72*m'*, it only rotates in one direction. Pointer 34*a* rotates clockwise, for example, and points to index 76*a* when dial 14 rotates clockwise. Pointer 34*a* rotates clockwise and points to index 76*b* when dial 14 rotates counterclockwise.

Figure 9:
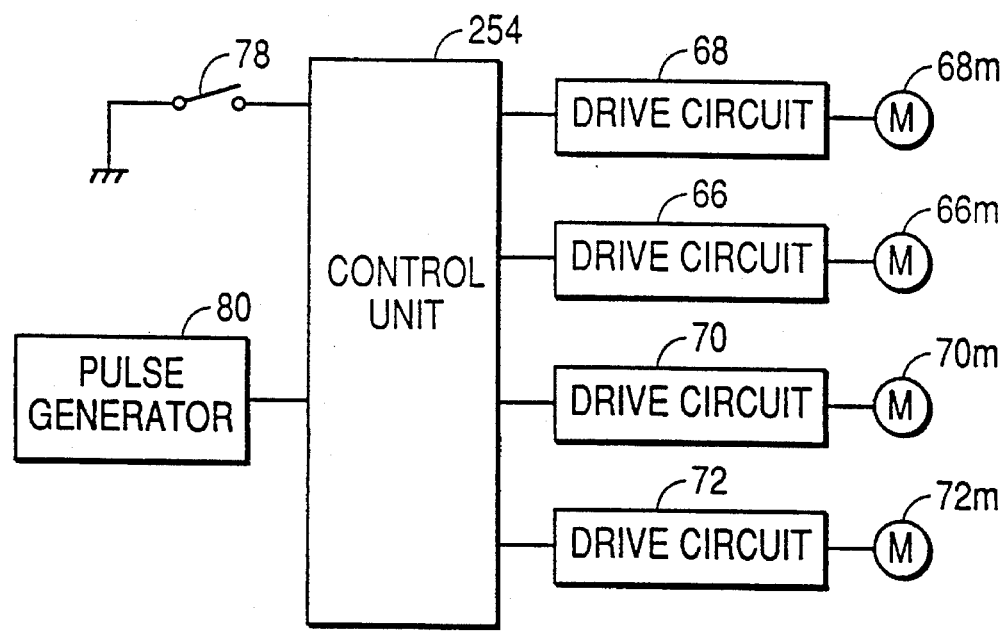
FIG. 9 is a block diagram showing an operation of the display apparatus in accordance with the second embodiment of the present invention.

FIG. 9 is a block diagram showing an operation of the display apparatus of the second embodiment. Control unit 254 includes a microcomputer and its peripheral components, and performs display control by the execution of a control program, described below. 78 is a switch which is set ON when the self-timer mode button 82 is depressed. Pulse generator 80 generates pulse signals in proportion to the amount of rotation and the direction of rotation of command dial 14. 68 is a drive circuit for a drive motor 68*m* which drives pointer 30*a* in rotation. 66 is a drive circuit of a drive motor 66*m* which rotates pointer 28*a*. 70 is a drive circuit of a drive motor 70*m* which rotates pointer 32*a*. 72 is a drive circuit of a stepping motor 72*m'* which rotates pointer 34*a*.

Figure 10:
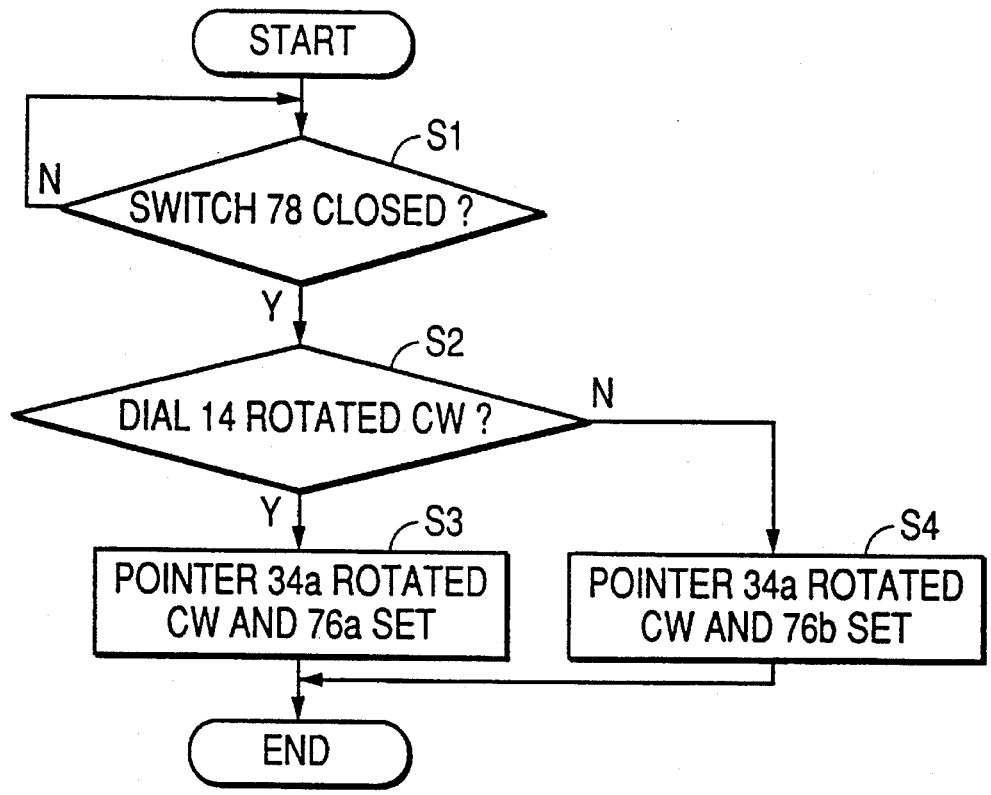
FIG. 10 is a flowchart illustrating a self-timer mode control program in accordance with the second embodiment of the present invention.

FIG. 10 is a flowchart showing the display control program in a self-timer mode for frame number display unit 34. In step S1, it is determined using switch 78, whether or not the self-timer mode button 82 has been depressed. If the self-timer mode button has been depressed, the program advances to step S2. Based on pulse signals generated by pulse generator 80, it is determined whether or not dial 14 has been rotated in a clockwise direction ("CW"). If the dial 14 has been revolved clockwise, the program proceeds to step S3. If the dial has not revolved clockwise, the program advances to S4. When dial 14 is revolved in a clockwise direction, in step S3, pointer 34*a* is rotated in a clockwise direction by the stepping motor 72*m'*, controlled by drive circuit 72. Furthermore, self-timer mode display unit 76 is set on the single timer mode index 76*a*, by control unit 254. On the other hand, when dial 14 has been revolved in a counter-clockwise direction, in step S4, pointer 34*a* is also rotated in a clockwise direction by stepping motor 72*m'*, controlled by drive circuit 72. Furthermore, self-timer mode display unit 76 is set on the double timer mode index 76*b*, by control unit 254.

Therefore, regardless of the direction of rotation of dial 14, the pointer 34*a* is driven to rotate in a clockwise direction. When the dial is revolved in a clockwise direction, the pointer is set on index 76*a* showing self-timer single mode. When the dial is revolved in the counterclockwise direction, the pointer is set on index 76*b* showing the double self-timer mode. The pointer is set in a position corresponding to the direction of rotation of the dial, just as if the pointer were able to rotate in both directions. The display apparatus of the second embodiment uses a clockwise unidirectional stepping motor 72*m'* typically used in analog clocks. The display apparatus is, therefore, smaller, costs less and is highly reliable.

Figure 11:
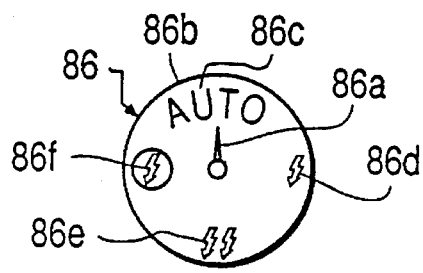
FIG. 11 is a view of a display unit of a display apparatus in accordance with a modification of the second embodiment of the present invention.

FIG. 11 shows a modification of the second embodiment of a display apparatus in camera 10. Display device 212 further includes a strobe display unit 86, operated in conjunction with strobe-mode button 84 shown in FIG. 7. When the strobe-mode button 84 is depressed, strobe photography mode is set, and the strobe mode can be selected by means of the dial 14. Strobe-mode display unit 86 includes a pointer scale 86b having indices showing four strobe modes, and a pointer 86a driven in rotation by a stepping motor similar to stepping motor 72m', and a drive circuit similar to drive circuit 72. Scale 86b includes indexes 86c, 86d, 86e and 86f. Index 86c corresponds to an automode in which camera 10 automatically performs strobe illumination. Index 86d corresponds to a forced light emission mode, in which light emission is forced. Index 86e corresponds to red eye prevention mode, in which, in order to prevent the "red eye" phenomenon, the strobe comprises a preliminary light emission proceeding the main light emission. Index 86f corresponds to an inhibition mode in which strobe light emission is inhibited.

Figure 12:
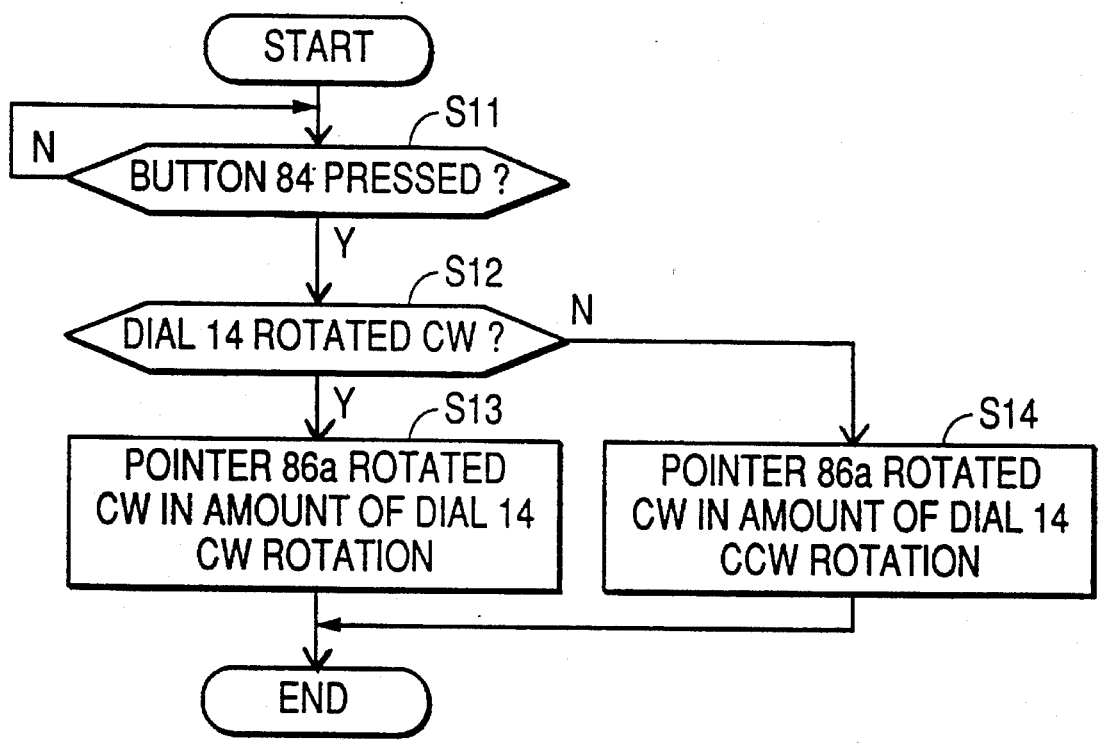
FIG. 12 is a flowchart illustrating a strobe mode control program in accordance with the modified second embodiment of the present invention.

FIG. 12 shows a flowchart illustrating a display control program in the strobe mode. In step S11, it is determined by means of a switch (not shown), which is set ON when the strobe mode button 84 has been pressed, whether or not the strobe mode button 84 has been pressed. If the strobe button 84 has been depressed, the program advances to step S12. Based on the pulse signals from pulse generator 80, it is determined whether or not dial 14 has revolved in a clockwise direction. When the dial has been revolved in a clockwise direction, the program proceeds to step S13. If, however, the dial was rotated in a counterclockwise direction, the program proceeds to step S14. When the dial 14 has revolved in a clockwise direction, in step S13, pointer 86a is rotated in a clockwise direction and set in a position proportional to the amount of rotation of dial 14. On the other hand, when dial 14 has revolved in a counterclockwise direction, in step S14, pointer 86a is rotated in a clockwise direction, and is set in a position on pointer scale 86b corresponding to the position had it rotated in a counterclockwise direction proportional to the amount of rotation of dial 14.

Therefore, regardless of the direction of the rotation of the dial 14, pointer 86a is always rotated in a clockwise direction. The pointer is set in a position corresponding to a direction of rotation and an amount of rotation of a dial, just as if the pointer were able to rotate in both directions. A variety of display units may be used instead of a strobe-mode display unit. Therefore, a stepping motor of unidirectional rotation, similar to those used in analog clocks, can be utilized in a camera having a relatively smaller and less expensive display apparatus.

Figure 13:
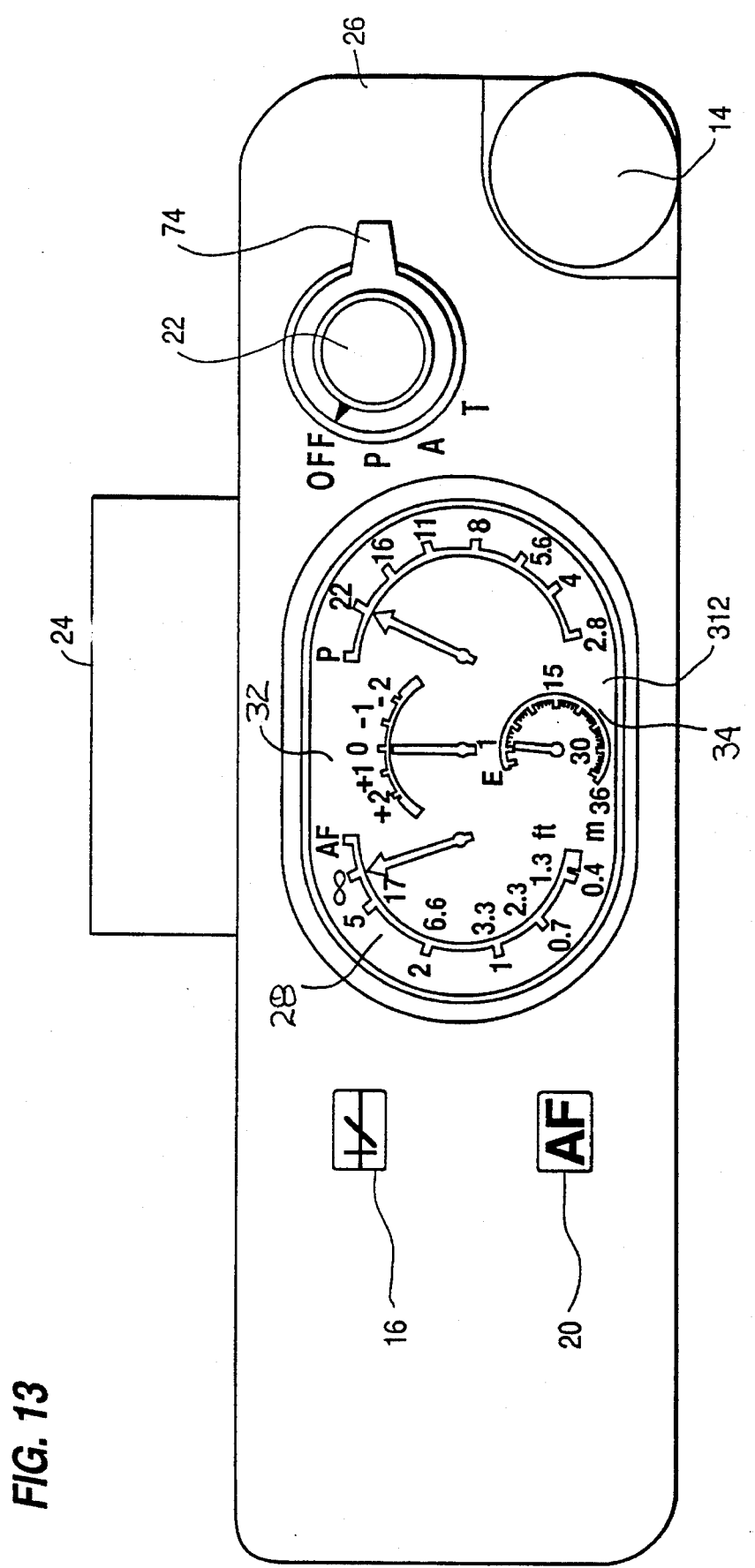
FIG. 13 is a top view of a camera including a display apparatus in accordance with a third embodiment of the present invention.

FIG. 13 shows a third embodiment of a display apparatus in a camera in accordance with the present invention. Like elements in the figures of the first, second and third embodiments have like reference numbers. Photographic lens barrel 24 protrudes from the front surface 27 (see FIG. 1) of camera 10. On the top surface 26 of camera 10 are release button 22, a mode selector button 74, a rotary dial 14, an AF mode button 20, exposure correction mode button 16 and display unit 312. Mode setting button 74 is a selector which selects various operations of camera 10, according to a previously determined program chart. For example, a program chart may include a program automatic exposure mode P ("P-AE mode") to automatically set the exposure, a stop priority automatic exposure mode A, a shutter speed priority automatic exposure mode T, and a stop mode OFF. Rotary dial 14 is rotated to change a stop value, an exposure correction value, a shutter speed value, and the like. When dial 14 is rotated while depressing AF mode button 20, the focusing distance can be set from the infinity position ∞ to the close position, 0.4 m, and in an automatic focus adjustment mode ("AF mode") and in a manual focus adjustment mode ("MF mode"). When dial 14 is revolved while depressing the exposure correction mode button 16, an exposure correction value in the range of +2 to −2 can be set. The display unit 312 is equipped with four rotary pointer type display units. Namely, a frame count display unit 34, an exposure correction value display unit 32, a focusing distance display unit 28, and a stop value display unit 30.

Figure 14:
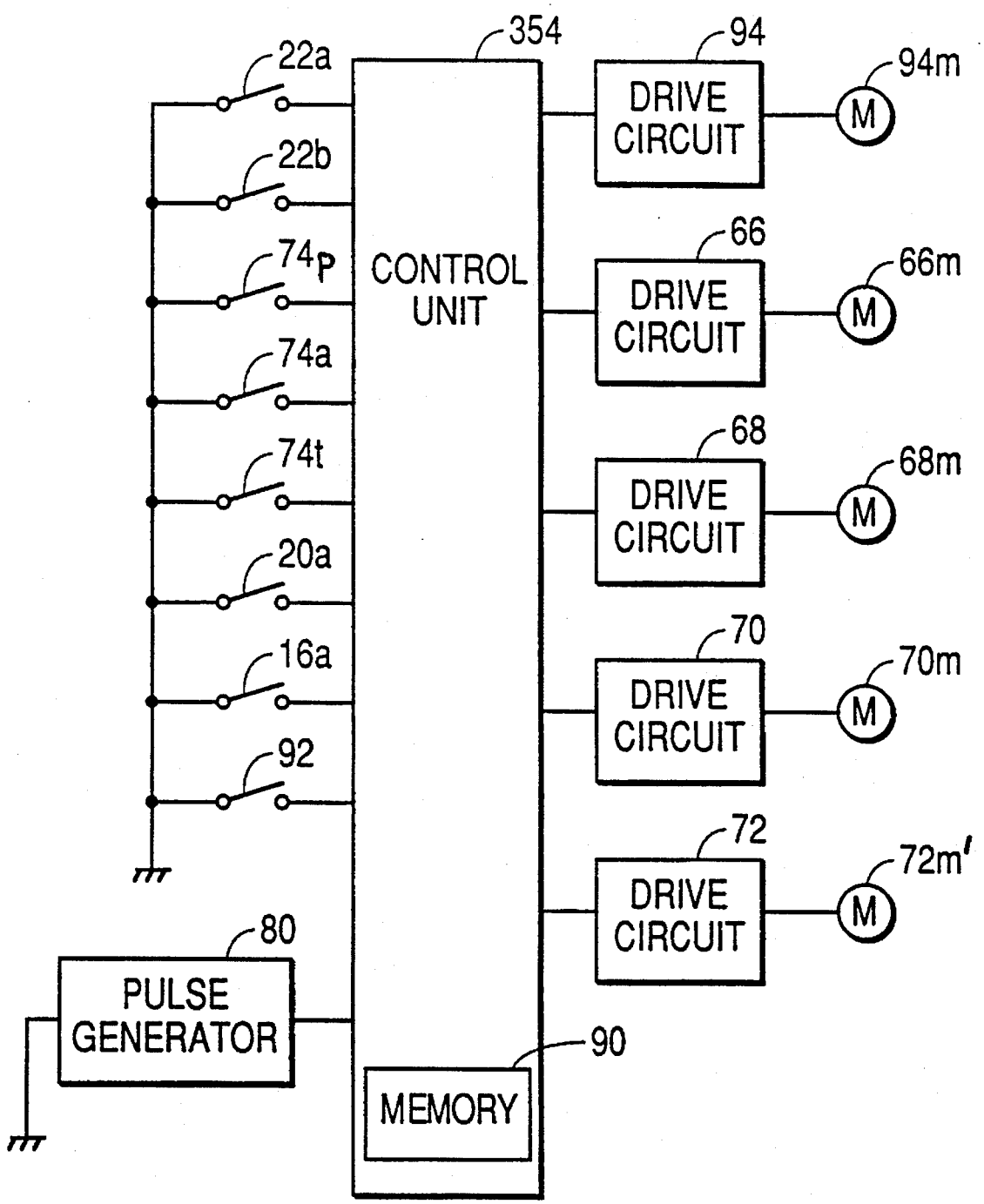
FIG. 14 is a block diagram showing an operation of the display apparatus in accordance with the third embodiment of the present invention.

FIG. 14 is a block diagram illustrating an operation of the display apparatus according to the third embodiment. Control unit 354 includes a microcomputer, a nonvolatile memory (EEPROM) 90 and other peripheral components. Control unit 354 performs control of camera sequences and various operations, and in addition, performs display control by executing the control program described below with respect to FIG. 16. Switches 22a and 22b are linked to release button 22. 22a is set ON when release button 22 is half depressed, and switch 22b is set ON when release button 22 is fully depressed. Switches 74p, 74a and 74t are switches linked to mode selector button 74. 74p is set ON when the mode selector is in the P position. 74a is set ON when mode selector button 74 set in the A position. Switch 74t is set ON when mode selector button 74 is in the T position. Switch 20a is linked to focusing button 20, and is set ON when the AF mode button 20 is depressed. Switch 16a is set ON when exposure correction button 16 is depressed. 92 is a switch which is set ON when the battery compartment cover is open. All the switches are connected to control unit 354.

Pulse generator 80 generates pulses according to the direction of rotation of revolving dial 14. Drive circuit 94 drives a film forwarding motor 94m, and is connected to control unit 354. Furthermore, drive circuits 66, 68, 70 and 72 drive motors 66m, 68m, 70m, and 72m' respectively. The drive circuits are connected to control unit 354. Stepping motor 72m' drives the rotation of the pointer 34a of the frame count display unit 34. Drive motor 70m drives the rotation of the pointer 32a of the exposure correction display unit 32. Drive motor 66m drives the rotation of the pointer 28a of the focusing distance display unit 28. Drive motor 68m drives the rotation of the pointer 30a of the stop display unit 30. Drive motors 66m, 70m and 30m are reversible, dedicated drive motors. Stepping motors 72m' is a unidirectional drive motor.

Figure 15:
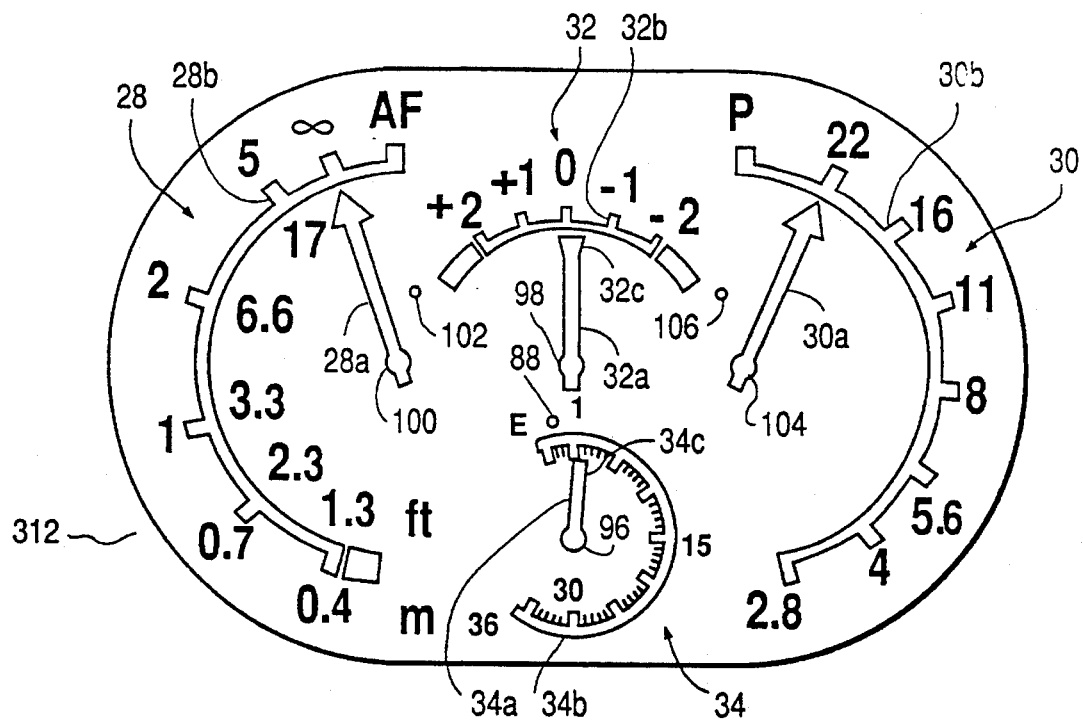
FIG. 15 is a view of a display device of the display apparatus in accordance with the third embodiment of the present invention.

FIG. 15 is an enlarged view of display unit 312. Frame count display unit 34 includes pointer 34a with a tip 34c, pointer scale 34b, and numerical values 1–36, for example, showing a representative frame number. Display unit 34 displays the frame number of the finished photography on the film. 96 is a shaft on which pointer 34a rotates. When film is forwarded using film forwarding motor 94m, control unit 354 drives the rotation of pointer 34a by means of stepping motor 72m' in proportion to the amount of forwarding. Furthermore, control unit 354 adds the drive amount during this time to the drive amount θ1 of the previous time stored in memory 90, and stores a resulting drive amount of pointer 34a as θ1 in memory 90.

Exposure correction display unit 32 includes pointer 32a, pointer scale 32b, and numerical values +2, +1, 0, −1 and −2 used to display the exposure correction value. 98 is a shaft on which pointer 32a rotates. 88 is a stop which limits the rotation of pointer 32a. The tip 32c of pointer 32a is shaped in a circular arcuate shape centered on rotation shaft 98.

Control unit 354, when switch 16a is ON, inputs pulse signals from pulse generator 80, and drives pointer 32a by means of drive motor 70m according to the number of input pulses and the polarity showing the direction of rotation. Furthermore, control unit 354 adds the drive amount occurring during this time to the drive amount of θ2 of the previous time stored in memory 90, and stores the resulting drive amount of pointer 32a as θ2 in memory 90.

Focusing display unit 28 includes pointer 28a, pointer scale 28b, and numerical values and symbols (0.4, 0.7, 1, 2, 5 m and 1.3, 2.3, 3.3, 6.6 and 17 ft, and also the symbol AF and the infinity symbol ∞). These values denote distances and an AF mode. 100 is a shaft on which pointer 28a rotates, and 102 is a stop which limits the rotation of pointer 28a. Control unit 354, when switch 20a is ON, inputs pulse signals from pulse generator 80, and drives pointer 28a by means of drive motor 66m according to the number of input pulses and the polarity showing the direction of rotation. In addition, control unit 354 adds the drive amount occurring this time to the drive amount θ3 of the previous time stored in memory 90, and stores the resulting drive amount of pointer 28a as θ3 in memory 90.

Stop display unit 30 includes pointer 30a, pointer scale 30b, and numerical values and symbols (2.8, 4, 5.6, 8, 11, 16, 22 and P) showing a stop value and a P-AE mode. 104 is a shaft on which pointer 30a rotates, and 106 is a stop which limits the rotation of pointer 30a. Control unit 354, when switch 74a is ON, inputs pulse signals from pulse generator 80, and drives pointer 30a by means of drive motor 68m according to the number of input pulses and the polarity showing the direction of rotation. In addition, control unit 354 adds the drive amount occurring this time to the drive amount θ4 previously stored in memory 90, and stores the resulting drive amount of pointer 30a as θ4 in memory 90.

Figure 17:
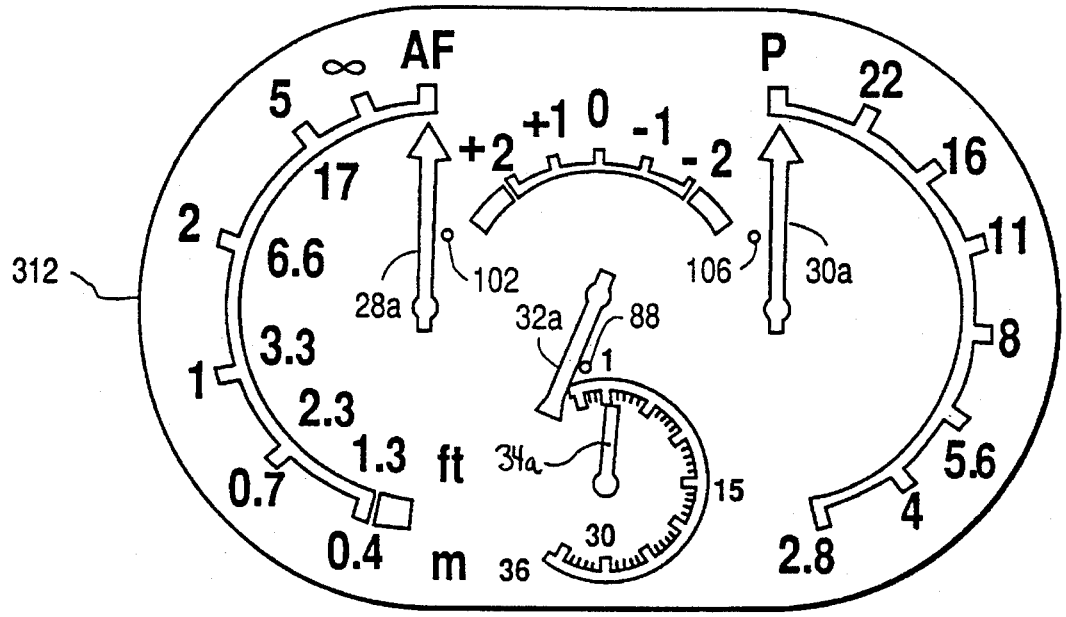
FIG. 17 is a view of a display device of the display apparatus in accordance with the third embodiment of a present invention.
Figure 18:
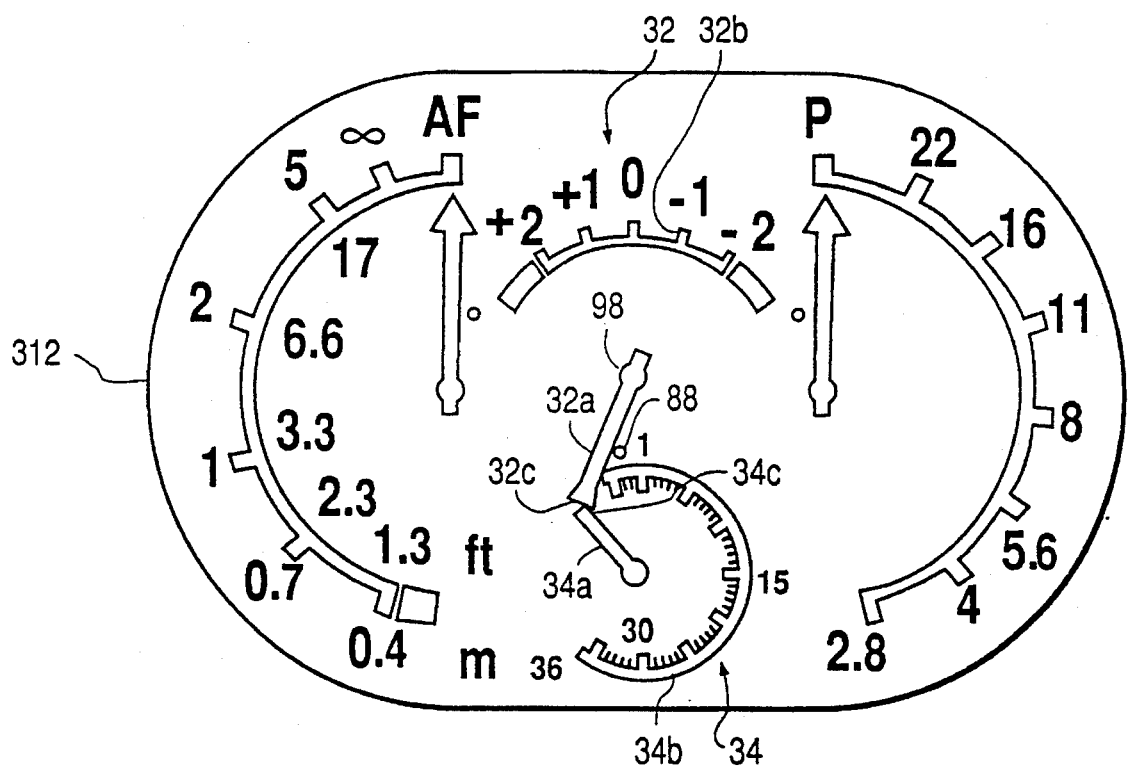
FIG. 18 is a view of a display device of the display apparatus in accordance with the third embodiment of the present invention.

FIG. 16 is a flowchart showing a standard position recognition program executed by a microcomputer of control unit 354. When switch 92 is switched from ON to OFF, corresponding to when a new battery is loaded into the battery compartment and the cover of the battery compartment has been closed, the microcomputer commences the execution of the program. At step S1, pointers 32a and 30a are driven to rotate in a counterclockwise direction, and pointer 28a is driven to rotate in a clockwise direction. Each of these pointers is driven to be brought into contact with their respective stops 88, 102 and 106. This is shown in FIG. 17. Next, in step S2, pointer 34a is driven to rotate in a clockwise direction, such that tip 34c of pointer 34a is brought into contact with tip 32c of pointer 32a. This is shown in FIG. 18. This causes tip 32c of pointer 32a to act as a stop for pointer 34a. Because tip 32c has a circular arcuate shape centered on shaft 98, when it comes into contact with pointer 34a, the force is absorbed by shaft 98. In step S3, the position of pointers 34a, 32a, 28a and 30a are initially set as their respective standard positions. In step S4, the amounts θ1, θ2, θ3 and θ4 of rotation of each pointer 28a, 30a, 32a and 34a, respectively, are read out. According to these amounts of rotation, each pointer is driven in a rotation and direction opposite to their corresponding stops. Furthermore, at this time, pointer 32a is first driven to rotate from pointer 34a, making the rotation of pointer 34a in a clockwise direction possible. Therefore, it is not necessary to drive pointer 32a in both a forward and reverse direction of rotation, and a unidirectional stepping motor may be used.

After pointer 32a has been rotating and comes into contact with stop 88, pointer 34a is rotated and comes into contact with pointer 32a. The position of pointers 34a and 32a are initially set as the standard position in a simple manner. Also, a motor driving in one direction may be used to drive pointer 34a, so that the drive can be made simple and the cost can be reduced. Furthermore, the standard position of each pointer is initially set when the cover of the battery compartment is closed, thereby resetting the display. The timing of resetting the display and initially setting the standard positions is not limited to this method. Instead, the time when the main switch of the camera is set ON, or the time when the back cover is closed, may be the time corresponding to the resetting of the display device and initially setting the standard positions. Furthermore, a display reset button may be provided, and the initial setting of the standard positions and the resetting of the display may be performed if the display reset button is operated. Moreover, the type of display unit is not limited to those discussed above.

The positions of the first and second pointers 32a and 34a in this state are their respective standard positions. After first pointer 32a has been rotated and brought into contact with stop 88, second pointer 34a is rotated and brought into contact with first pointer 32a. Then, by initially setting the position of the first and second pointers 32a and 34a as a respective standard position, the standard position of 34a can be set by a simple mechanism.

Figure 19:
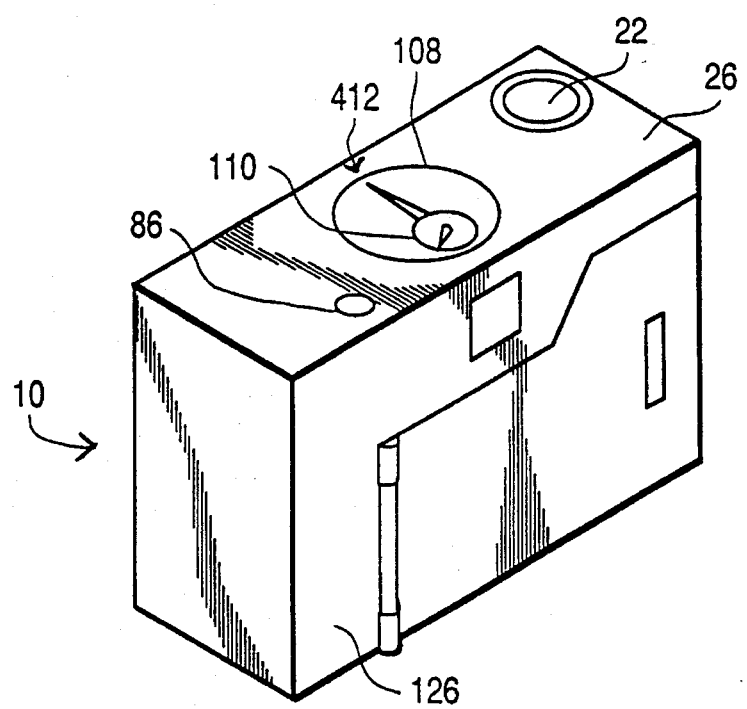
FIG. 19 is a perspective rear view of a camera including a display apparatus in accordance with a fourth embodiment of the present invention.

FIG. 19 shows a fourth embodiment of a display apparatus in a camera, in accordance with the present invention. Like elements in the figures of the first, second, third and fourth embodiments have like reference numerals. FIG. 19 shows camera 10 viewed from its rear. Top surface 26 of camera 10 includes a display device 412, having two display units 108 and 110. 108 is a large display unit and 110 is a small display unit within display unit 108. Top surface 26 also includes mode setting button 86 and release button 22.

Figure 20:
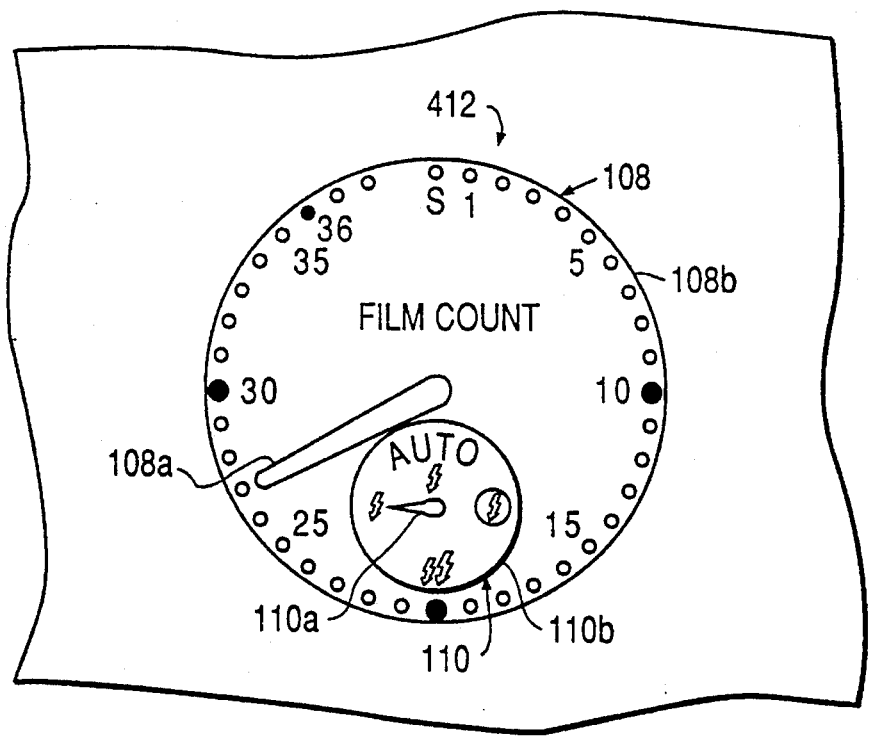
FIG. 20 is a view of a display device of the display apparatus in accordance with the fourth embodiment of the present invention.

FIG. 20 is an enlarged view of display device 412. Large rotating display unit 108 includes a pointer 108a and a pointer scale 108b, with which to display a frame count 1–36 of the film. The pointer 108a rotates, for each frame advance, in a clockwise direction above pointer scale 108b. Small rotating pointer display 110 is arranged on pointer scale 108b of large display unit 108, within the range of rotation of large pointer 108a. Small display unit 110 has a pointer 110a and a pointer scale 110b, to display various strobe photography modes (corresponding to display unit 86 in FIG. 11). Pointer 110a is indicating the symbol on pointer scale 110b for the forced light emission mode, and the forced light emission mode is therefore. When pointer 110a is rotated from this position in a clockwise direction, it changes over in succession to the automatic light emission mode, then the light emission prohibition mode, and then the pre-light emission mode.

Figure 21:
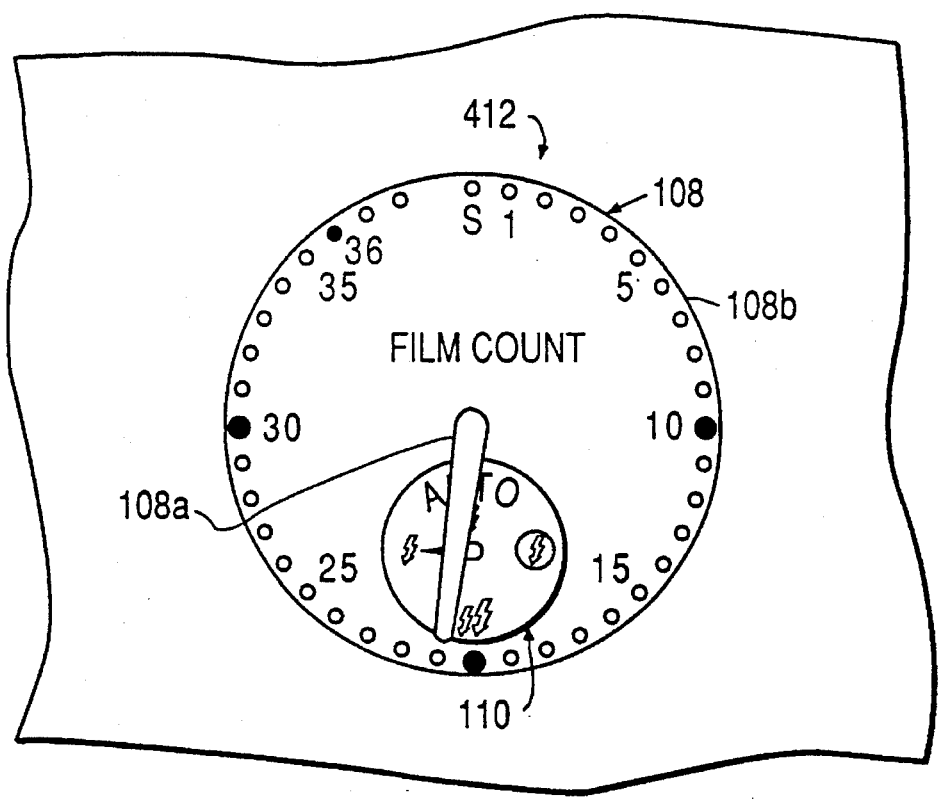
FIG. 21 is a view of the display device of the fourth embodiment of the present invention.

FIG. 21 shows large pointer 108a indicating the 21st frame of pointer scale 108b. Pointer 108a overlaps small display unit 110. In this state, the display content of the small display unit 110 cannot be seen, and therefore a strobe photography mode cannot be set. According to the display apparatus of the fourth embodiment, when setting the small display unit 110 in the state in which large pointer 108a overlaps small display unit 110, pointer 108a is moved away from display unit 110, as shown in FIG. 20. Upon concluding the setting of the small display unit 110, pointer 108a is then returned to the position of the previous setting, corresponding to the position indicated in FIG. 21. The non-overlapping position of large pointer 108a, when moved away, corresponds to a minimum amount of movement of pointer 108a from an overlapping state. This way, small display unit 110 can be quickly set.

Large pointer 108a, overlapping small display unit 110, may instead be moved away in only a prescribed amount in a prescribed direction. Considering a direction of movement as clockwise, in the range in which pointer 108a overlaps display unit 110, the amount of movement of large pointer 108a becomes greatest when large pointer 108a indicates the 15th frame. If it is moved in a rotation of 11 frames in a clockwise direction as far as the 26th frame, overlapping will be avoided. Accordingly, when the large pointer 108a overlaps small display unit 110, large pointer 108a is moved a set prescribed amount, here 11 frames, in order to avoid overlapping. The setting of the small display unit 110 once having been concluded, is returned only by its prescribed amount. Therefore, it is not necessary to calculate on each occasion the position where the movement amount becomes smallest, and the load on the microcomputer is reduced. Moreover, when setting the small display unit 110, the large pointer 108a may be moved away to a position differing from its usual indicating position, for example, to a position between the 38th frame mark and the start position S. This way, the indicating position of pointer 108 will not be misunderstood.

Figure 22:
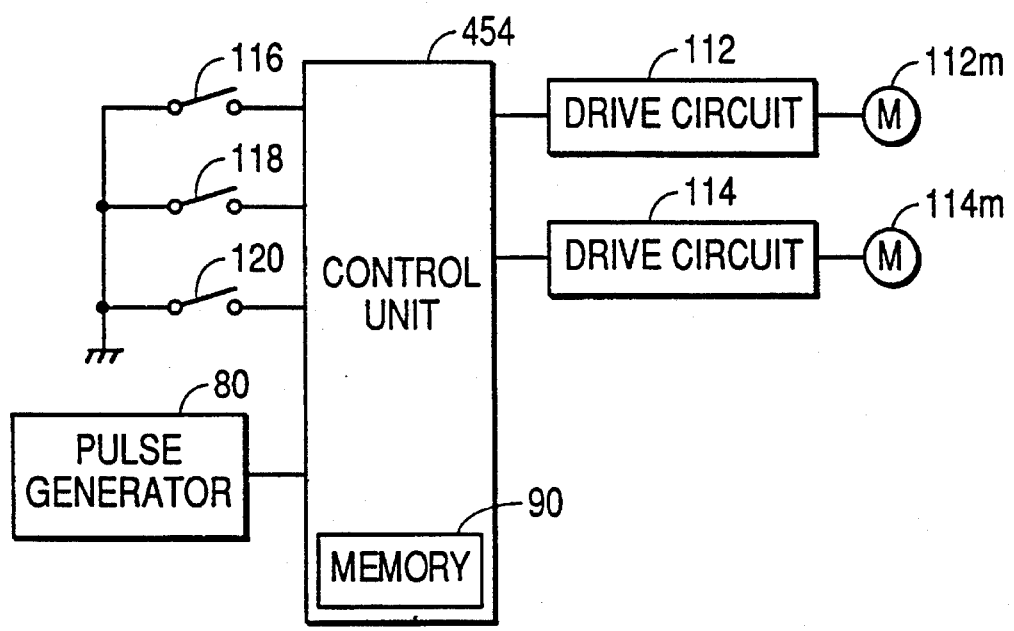
FIG. 22 is a block diagram showing an operation of the display apparatus in accordance with the fourth embodiment of the present invention.

FIG. 22 is a block diagram showing how the fourth embodiment operates. Control unit 454 includes a microcomputer and memory 90, and other peripheral components. Control unit 454 controls various operations and sequences of the camera, and in addition, executes a control program described with reference to FIG. 23 below, to control the display device 412. Drive circuit 112 drives motor 112m which rotates pointer 108a. Drive circuit 114 drives stepping motor 114m which rotates small pointer 110a. Motor 114m is a unidirectional stepping motor, as discussed with reference to FIG. 11. Switch 116 is linked to the mode setting button 86. When the mode setting button 86 is depressed, switch 116 is closed. Switch 118 closes when pointer 108a of large display unit 108 is in its initial position, namely start position S. Switch 120 closes when pointer 110a of small display unit 110 is in its initial position, namely automatic light emission AUTO position. Pulse generator 80 generates pulses, linked to a free sprocket (not shown). The free sprocket rotates when film is being wound up, and generates 8 pulses per frame. Memory 90 stores an amount of rotation of pointers 108a and 110a.

Figure 23:
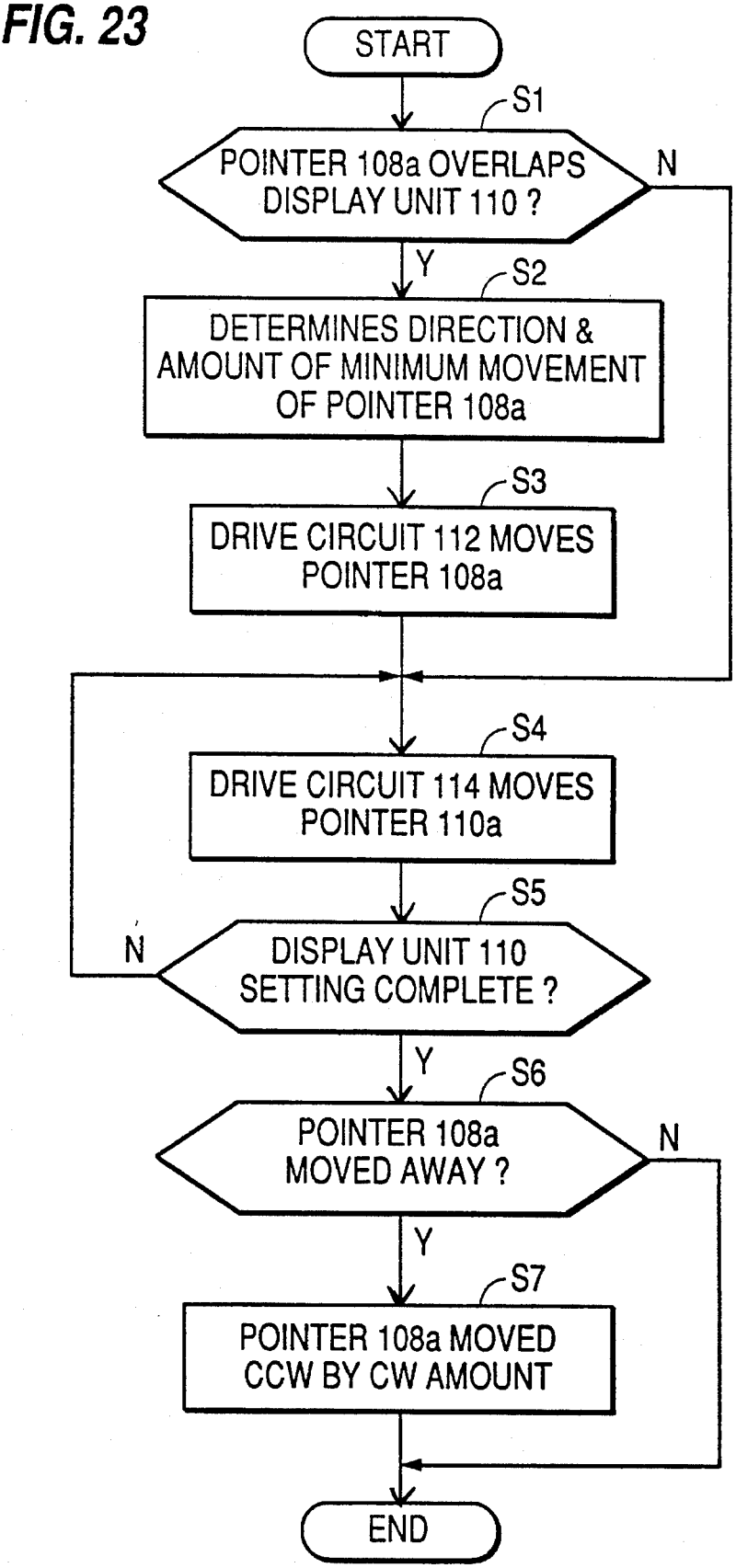
FIG. 23 is a flowchart illustrating a control program to move a pointer in accordance with the fourth embodiment of the present invention.

FIG. 23 is a flowchart showing an execution of a control program by the microcomputer of control unit 454. FIG. 23 illustrates the case in which pointer 108a is moved away when large pointer 108a overlaps small display unit 110, in a direction providing a minimum amount of movement. The program begins when mode setting button 84 of small display unit 110 is depressed and switch 116 closes. In step S1, after execution begins, it is determined whether or not large pointer 108a overlaps small display unit 110. If large pointer 108a is in the range of frames 15–25, the program advances to step S2. If not, the program advances to step S4. In step S2, the direction and amount of movement of large pointer 108a for a minimum amount of movement are calculated. If large pointer 108a is in a position in frames 15–20, the large pointer 108a is moved away to the position of frame 14, being rotated counterclockwise. If large pointer 108a is in a position in frames 21–25, it is moved away to the position of frame 26, being rotated clockwise. In step S3, according to the determined direction and amount of movement, drive circuit 112 is controlled, and large pointer 108a is moved away. In step S4, switch 118 linked to mode setting button 86 is closed, drive circuit 114 is controlled to drive stepping motor 114m, and small pointer 110a is rotated clockwise through 90°. At step S5, it is determined whether or not the setting of the small display unit 110 is completed. If the setting has been completed, the program proceeds to step S6. If not, the program returns to step S4. It may be determined that setting has been completed if the mode setting button has not been operated for a prescribed amount of time after completing the setting of small display unit 110. In step S6, it is determined whether or not large pointer 108a, initially overlapping small display unit 110, has been moved away. If it has been moved away, the program proceeds to step S7. If it has not been moved away, the program skips step S7 and ends. In step S7, large pointer 108a is moved counterclockwise by only the same amount of movement as it was moved away clockwise, and it is returned to its position prior to the setting of small display unit 110.

When setting the small display unit 110, if it is detected that large pointer 108a is overlapping small display unit 110, the large pointer 108a is moved away to a non-overlapping position. After the setting has been completed, large pointer 108a is returned to its position prior to setting. Therefore, small display unit 110 becomes easily visible, and its setting operation becomes easy to perform.

Moreover, although the fourth embodiment has been described with respect to a camera, it is not limited to a camera. It can be applied to a display device of a clock or a meter having a small display unit within a large rotary pointer display unit. Furthermore, the fourth embodiment illustrates one small display unit arranged with a large rotary display unit. However, the number and position of the small display unit is not limited to the above embodiment example. When a plurality of small display units are arranged, during setting of the respective small display units, the large pointer may be set such that it does not overlap the display unit. Furthermore, the present invention is not limited to the case in which a small rotary display unit is arranged within a large rotary display unit. It can also be applied to a display device in which an image display device such as a small LCD has been arranged within the large display rotary display unit. The overlapping of the small display unit by the large pointer has been detected based on the amount of movement from the initial position of the large pointer. However, the present position of the large pointer may be detected by arranging read switches or similar detectors in the overlap range. Furthermore, a read switch may also be arranged in the moved away position, and a large pointer may be moved away as far as the position at which this read switch operates. Moreover, the overlap range of the large pointer over the small display unit maybe divided into halves, and a read switch may be arranged in each region. For example, in the above case, individual read switches are arranged in the region of frames 15–20 and the region of frames 21–25. When large pointer 108a is in the region of frames 15–20, the large pointer 108a is rotated counterclockwise and moved away as far as position 14, outside the read switch. In contrast, when large point 108a is in the region of frames 21–25, it is rotated clockwise and moved away as far as position 26, outside the read switch.

Figure 24:
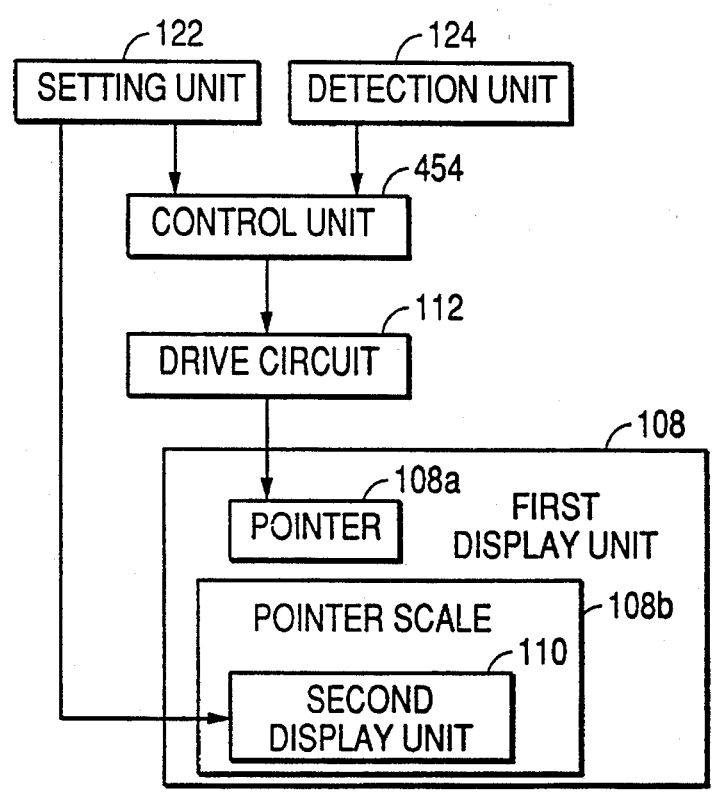
FIG. 24 is a block diagram illustrating an operation of the display apparatus in accordance with the fourth embodiment of the present invention.

FIG. 24 is a block diagram of an operation of the fourth embodiment. Display unit 108 displays various information using a pointer 108a above a pointer scale 108b. Drive unit 112 drives pointer 108a. Display unit 110 is arranged within the range of rotation of pointer 108a above pointer scale 108b. A setting unit 122 includes mode setting buttons 86 and switch 116, used to set display unit 110. A detection unit 124, corresponds to switch 118, memory 90 and control unit 454. Control unit 454 moves pointer 108a away with drive circuit 112, when it is detected by detecting unit 124, at the time of setting by setting unit 122, that pointer 108a overlaps display unit 110. Pointer 108a is moved away to a non-overlapping position. After setting information in setting unit 122, pointer 108a is returned to its position prior to setting. Control unit 454 moves pointer 108a away such that its amount of movement becomes minimum. Control unit 454 may also move pointer 108 away in a prescribed direction by a prescribed amount. Furthermore, control unit 454 may move pointer 108a away to a position different from its usual indicating position.

Figure 25:
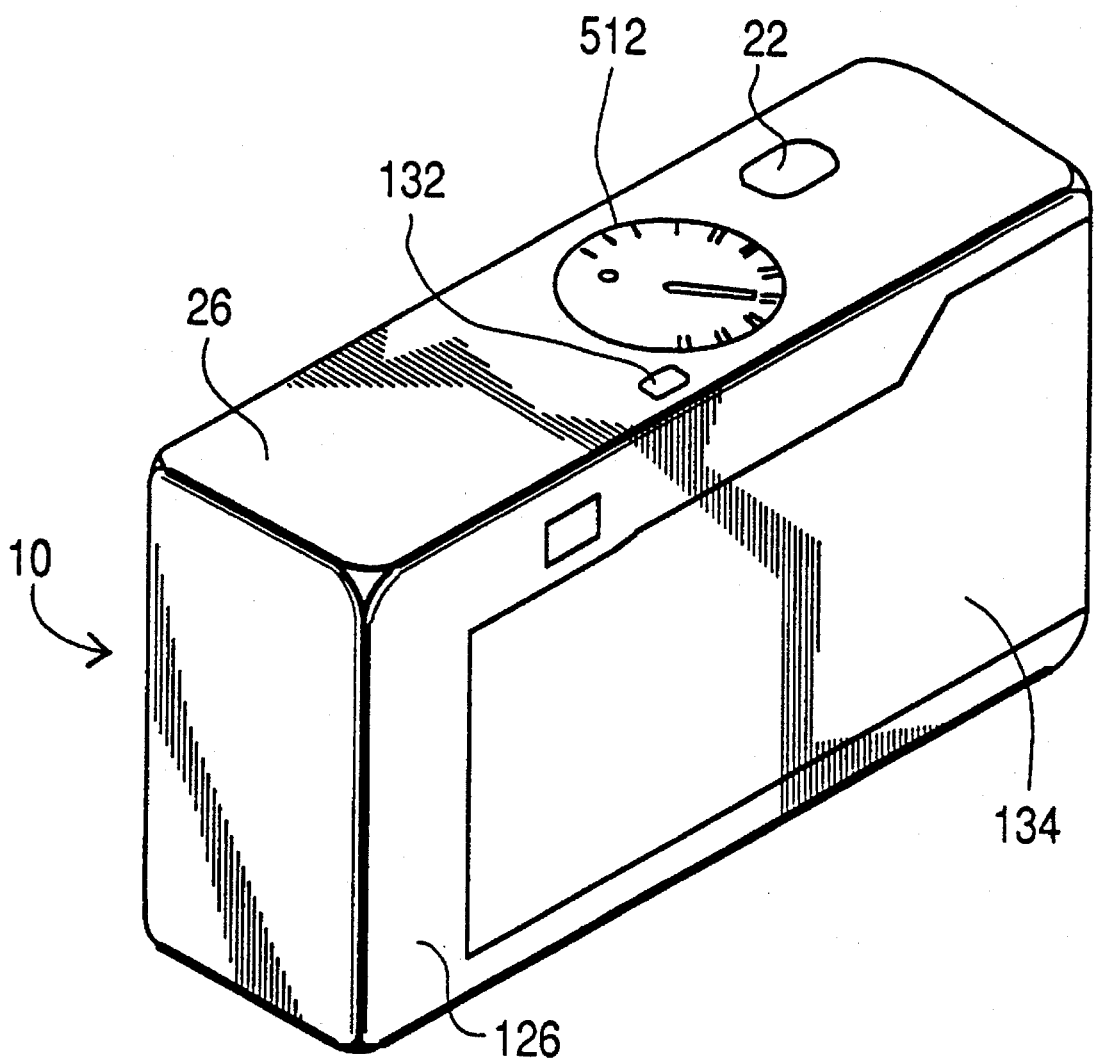
FIG. 25 is a perspective rear view of a camera including a display apparatus in accordance with a fifth embodiment of the present invention.

FIG. 25 shows a fifth embodiment of a display apparatus in a camera, in accordance with the present invention. Like elements in the figures of the first, second, third, fourth and fifth embodiments have like reference numerals. FIG. 25 shows top portion 26 of camera 10 which includes display device 512, display reset button 132 and shutter release button 22. The rear camera surface 126 includes back cover 134. Display device 512 includes one display unit, for example, frame number display unit 34. Display reset button 132 is used to reset the contents of display unit 34.

Figure 26:
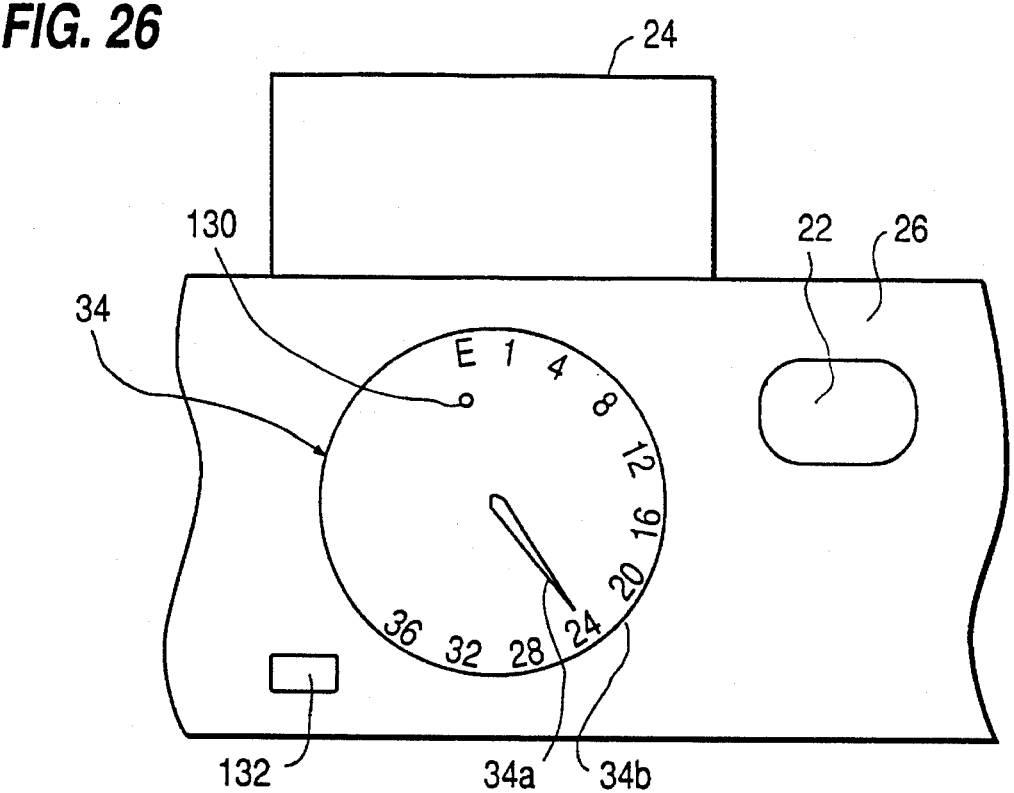
FIG. 26 is a view of the top surface of the camera in accordance with the fifth embodiment of the present invention.

FIG. 26 is an enlarged view of front surface 26 of camera 10 according to the fifth embodiment. Frame number display unit 34 includes pointer 34a and pointer scale 34b inscribed to show numbers 1–36 and letter "E" Pointer 34a is driven to rotate above pointer scale 34b. Frame number display unit 34 further includes stop 130 used to limit the rotation of pointer 34a so that it does not rotate counterclockwise, beyond the position E. Lens barrel 24 is seen from this top view of camera 10.

Figure 27:
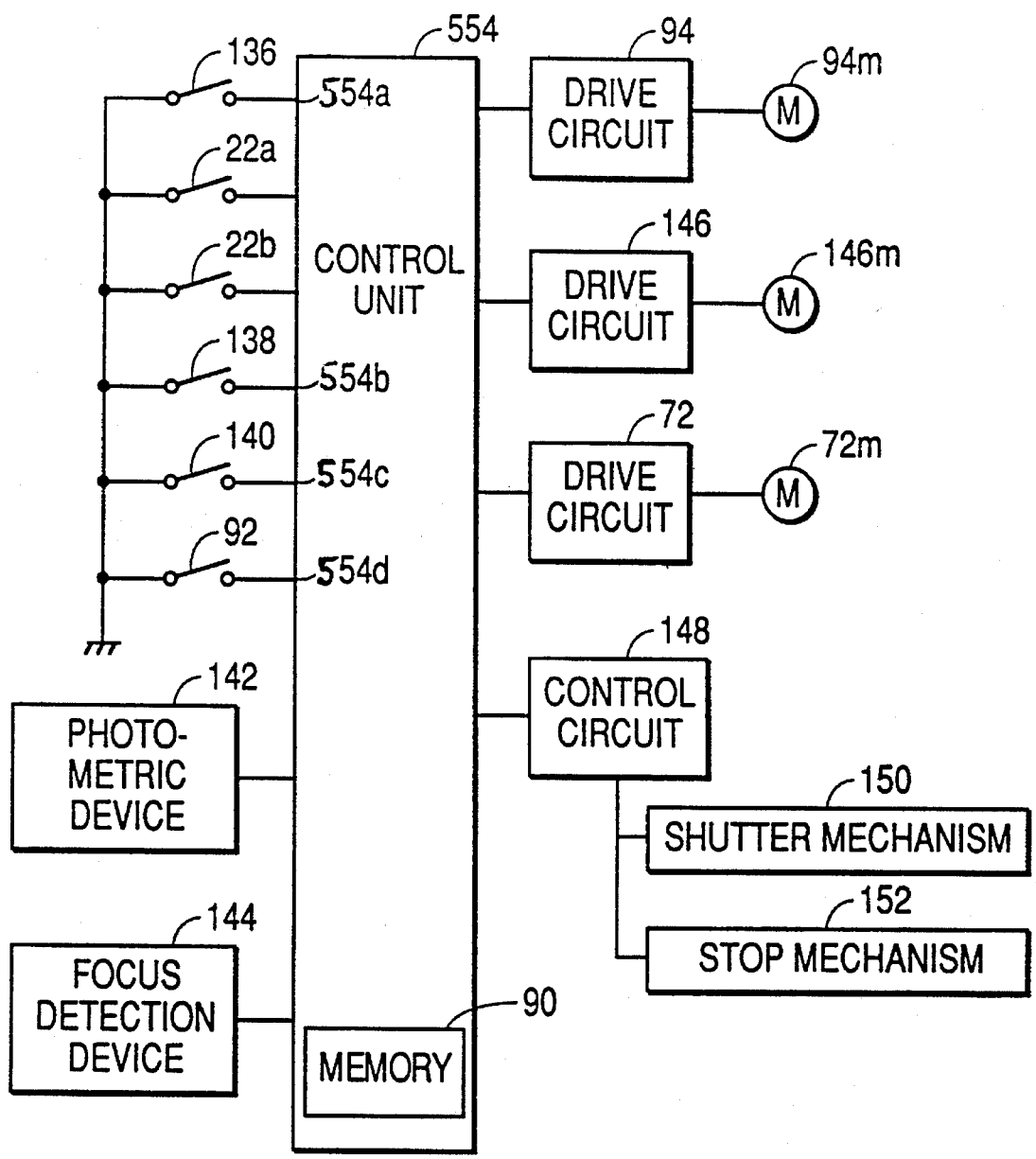
FIG. 27 is a block diagram showing an operation of the display apparatus in accordance with the fifth embodiment of the present invention.

FIG. 27 is a block diagram of the operation of the display apparatus. 554 is a control unit including a microcomputer and non-volatile memory (EEPROM) 90, and other peripheral components. Control unit 554 performs sequence control and various operations of the camera, and in addition, performs display control by executing the control program discussed in detail with respect to FIG. 28, below. 136 is a switch which is ON when display reset button 132 is depressed. Switch 22a is ON when release button 22 is half depressed. Switch 22b is ON when release button 22 is fully depressed. Camera 10 also includes main switch 138. Switch 140 is ON when camera back 134 is open. Switch 92 is ON when battery cover (not shown) is open. These switches are connected to control unit 554. Also connected to control unit 554 are drive circuit 94, drive circuit 146, drive circuit 72, and control circuit 148, in addition to photometric device 142 and focus detection device 144. Photometric device 142 measures the brightness of the photographic field. Focus detection device 144 detects the state of focal adjustment of the photographic lens 24. Film forwarding drive circuit 94 drives film forwarding motor 94m. Photographic lens drive circuit 146 drives lens motor 146m. Drive circuit 72 drives motor 72m to rotate pointer 34a. Exposure control circuit 148 drives and controls a shutter mechanism unit 150 and a stop mechanism unit 152, and other related mechanisms.

Figure 30:
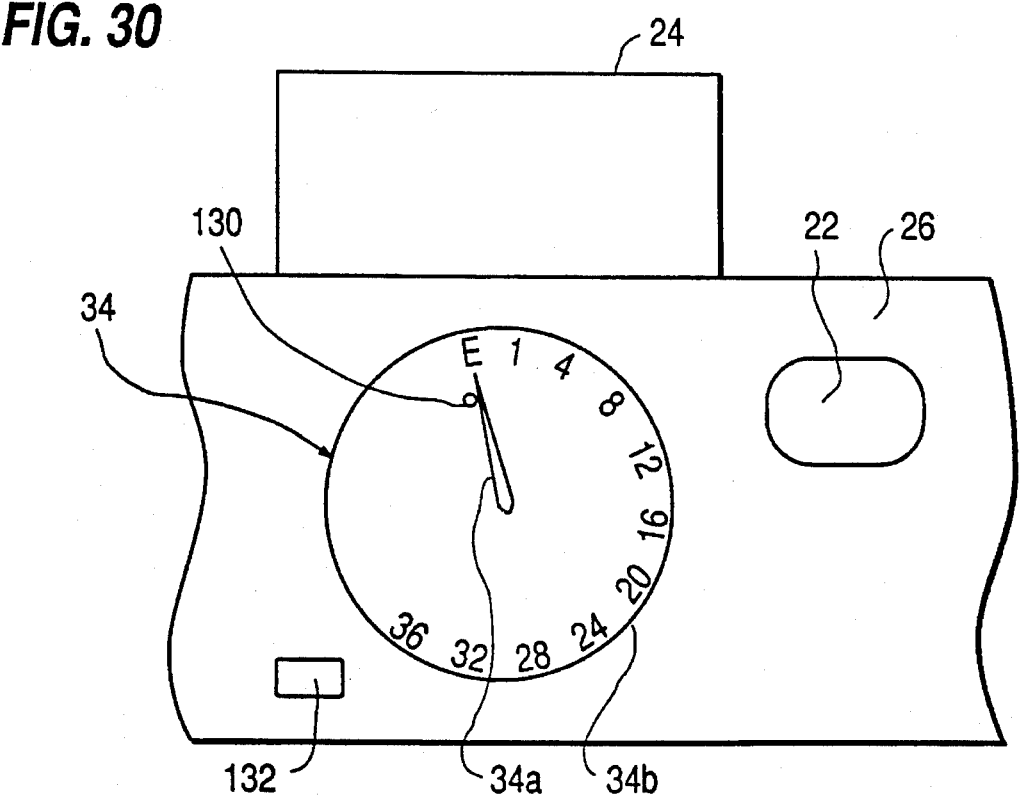
FIG. 30 is a view of the top surface of the camera in accordance with the fifth embodiment of the present invention.
Figure 28:
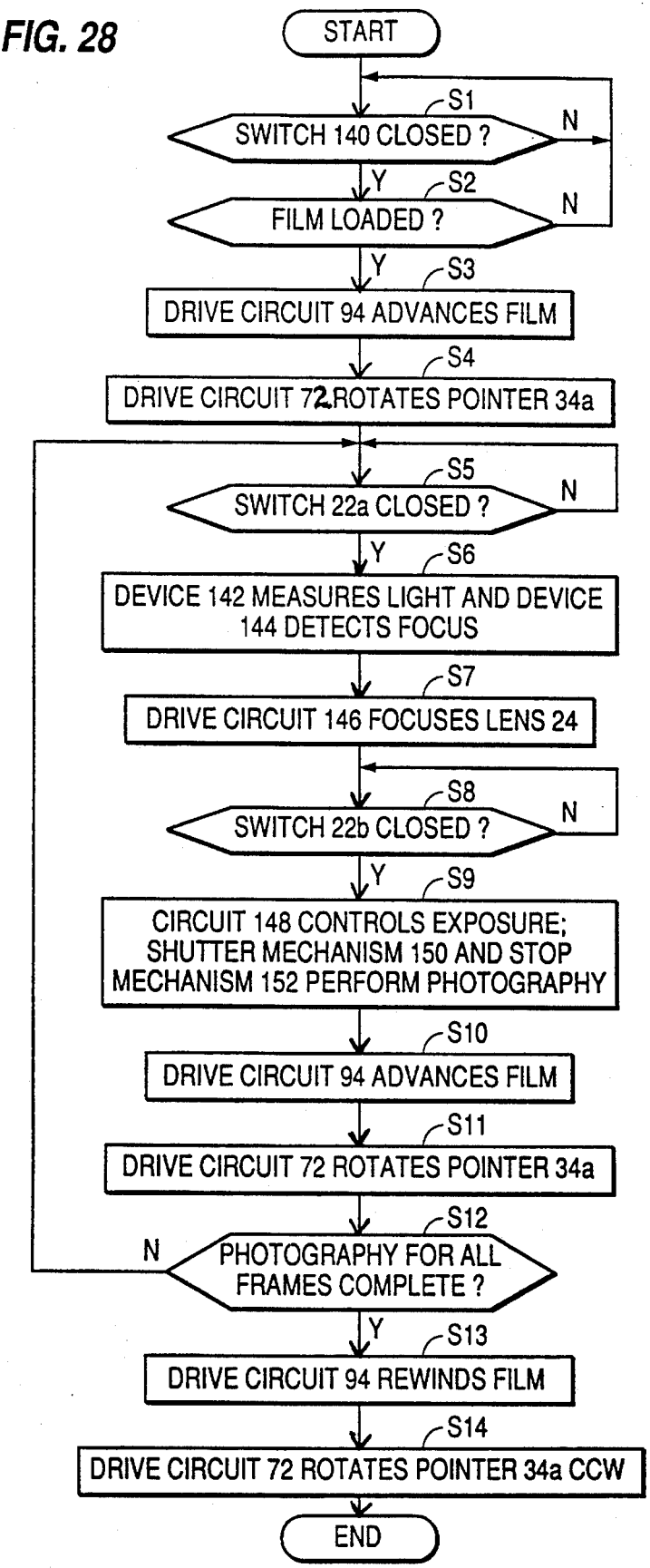
FIG. 28 is a flowchart illustrating a control program in accordance with the fifth embodiment of the present invention.

FIG. 28 is a flowchart showing the execution of a main program by the microcomputer of control unit 554. When main switch 138 is set ON, the microcomputer of control unit 554 begins execution of the control program. When main switch is set OFF, the execution of the program is terminated. In step S1, it is determined by switch 140 whether or not camera back 134 is closed. If camera back 134 is closed, the program advances to step S2. In step S2 it is determined whether or not film is loaded, by a film loading detector switch (not shown). If film is loaded, the program advances to step S3. If film is not loaded, the program returns to step S1. Film is loaded in a cartridge compartment (not shown) and when camera back 134 is closed, pointer 34a, as shown in FIG. 30, is in contact with stop 130 and points to the scale mark "E". In step S3, by controlling film advance drive circuit 94, the film is advanced by the film advance drive motor 94m, and is set to the prescribed photographic position of the first photographic frame. Continuing to step S4, by controlling drive circuit 72, pointer 34a is rotated as far as the scale mark "1" motor 72m. In addition, the amount of rotation of pointer 34a from the position of the stop 130 is stored in memory 90. In step S5, it is determined by switch 22a, whether or not release button 22 is half depressed. If release button 22 is half depressed, the program advances to step S6. In step S6, a light measurement is performed by the photometric device 142 and a focus detection is performed by the focus detection device 144. Continuing to step S7, based on the focus detection result, the photographic lens drive circuit 146 is controlled to drive lens motor 146m, and the photographic lens 24 is focused. Continuing to step S8, it is determined by switch 22b whether or not release button 22 is fully depressed. If release button 22 is fully depressed, the program proceeds to step S9, and exposure control circuit 148 is controlled according to the exposure value calculated based on the photometric result, and photography is performed by shutter mechanism unit 150 and stop mechanism 152.

After photography, in step S10, the film forwarding motor drive circuit 94 is controlled, and winding up of the film by one frame is performed. Continuing to step S11, drive circuit 72 is controlled, and pointer 34a is rotated clockwise by one frame division. In addition, the amount of rotation of pointer 34a this time is added to the amount θ of rotation stored in the memory 90. As a result of the addition, an amount θ of rotation is again stored in memory 90. In step S12, it is determined whether photography of all of the photographic frames has been completed. If completed, the program proceeds to step S13. If not completed, the program returns to step S5. In step S13, film forwarding motor drive circuit 94 is controlled and after rewinding of the film has been performed in step S14, drive circuit 72 is controlled and pointer 34a is rotated counterclockwise to the scale mark "E". Pointer 34a is set to the position of stop 130. In addition, the amount of rotation θ=0 is stored in memory 90. In this manner, pointer 34a is driven to rotate in proportion to the amount of forwarding every time film forwarding is performed. The amount of rotation θ from stop 130 is integrated and stored in the non-volatile memory 90. Accordingly, the amount of rotation of pointer 34a is not extinguished even if the electric supply of the camera fails.

Figure 29:
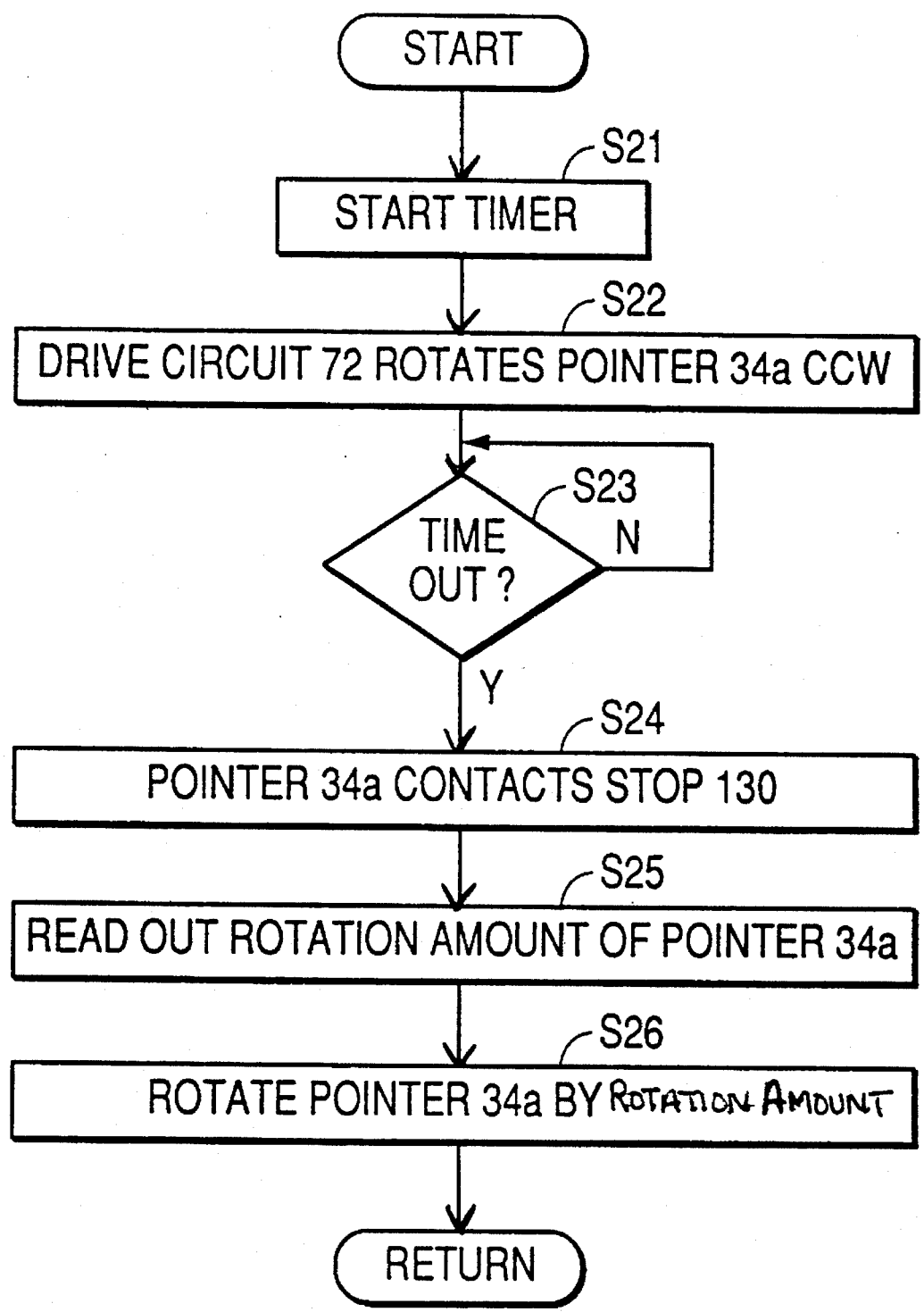
FIG. 29 is a flowchart illustrating a display setting routine control program in accordance with the fifth embodiment of the present invention.

FIG. 29 is a flowchart illustrating an interruption process generated by the microcomputer when display reset button 132 generates a display reset signal. When an interruption is generated, the microcomputer executes a display reset routine according to the program illustrated in FIG. 29. When reset button 132 is actuated, switch 136 is set ON, and the input terminal 554a (see FIG. 27) of control circuit 554 changes from a high level to a low level. When the main switch 138 is closed, input terminal 554b changes from a high level to a low level. When the back cover 134 is closed, switch 140 is set OFF, and input terminal 554c of control unit 554 changes from a low level to a high level. When the cover of the battery compartment is closed, switch 92 is set OFF, and input terminal 554d changes from a low level to a high level.

In step S21, a timer is started. Continuing to step S22, drive circuit 72 is controlled, and pointer 34a is rotated counterclockwise ("CCW"). In step S23, it is determined whether or not the timer has run out. If time has run out, the program proceeds to step S24, and drive circuit 72 stops driving motor 72m. At this time, pointer 34a, as shown in FIG. 30, is in contact with stop 130. A slightly longer time is set in the timer than the time necessary for pointer 34a to be rotated from the maximum display position "36" to the position of the stop 130. Next, in step S25, the amount θ of rotation of pointer 34a, stored in memory 90, is read out. Continuing to step S26, pointer 34a is rotated clockwise by the amount θ. In this manner, an interruption is generated in the microcomputer by means of the display reset signal from display reset button 132. In the interruption routine, pointer 34a is rotated in one direction, in response to a reset signal. After pointer 34a has come into contact with stop 130 located at a prescribed position on pointer scale 34b, pointer 34a is rotated in the opposite direction by only the integrated value of the amount θ of rotation stored in memory 90. Therefore, a discrepancy in the display content is automatically corrected to the correct rotation position.

Although the above embodiment is related to a frame count display unit, the display device of the present invention is not limited to a frame count display device. The display device of the fifth embodiment of the present invention can also be applied to display devices which display a strobe mode, a self-timer mode, an exposure correction value, stop value, a shutter speed, a photographic range, and various other photographic information of a camera. In addition, it can be a part of a display device to other equipment, in addition to cameras. Moreover, the display apparatuses of embodiments one, two, three, four and five may be included in various mechanical and electrical devices, in addition to cameras.

Although a few preferred embodiments of the present invention have been shown and described, it will be appreciated by those skilled in the art that changes may be made in these embodiments without departing from the principles and the spirit of the invention, the scope of which is defined in the appended claims and their equivalents.

What is claimed is:

1. A display apparatus in a camera for displaying photographic information using rotating elements, comprising:

rotating setting means, being directly rotated by a user, for rotatively setting photographic information;

display means, including at least one pointer scale and at least one pointer, for displaying the photographic information set by said rotating setting means, said at least one pointer scale including the photographic information, said at least one pointer indicating the photographic information by pointing to the photographic information set by said rotating setting means, one of said at least one pointer and said at least one pointer scale being fixed and the other rotating about said fixed one;

detection means for detecting a direction of rotation of said rotating setting means;

drive means for rotating a rotating element, said rotating element being one of said at least one pointer and said at least one pointer scale, in said display means; and control means for controlling said drive means to rotate said rotating element in the same direction as said direction of said rotating setting means detected by said detection means.

2. The display apparatus as claimed in claim 1, wherein said drive means mechanically rotates said rotating element in said display means and includes at least one drive circuit and at least one drive motor to mechanically rotate said rotating element.

3. The display apparatus as claimed in claim 2, wherein said at least one drive motor is a reversible dedicated drive motor which can rotate said rotating element in both a clockwise and counterclockwise direction.

4. The display apparatus as claimed in claim 1, wherein said display means displays an image of said at least one pointer and said at least one pointer scale and said drive means provides electric power to said display means for displaying the image.

5. The display apparatus as claimed in claim 3, wherein said display means includes four display units, a first of said four display units being a focal distance display unit, a second of said four display units being a frame number display unit, a third of said four display units being an exposure correction value display unit, and a fourth of said four display units being a stop value display unit, each of said four display units including one of said at least one pointer and one of said at least one pointer scale wherein one of said pointer and said pointer scale is fixed and the other rotates about said fixed one.

6. The display apparatus as claimed in claim 5, wherein said at least one reversible dedicated drive motors includes four reversible dedicated drive motors, each respectively rotating said rotating element in said focal distance display unit, said stop value display unit, said exposure correction value display unit, and said frame number display unit.

7. The display apparatus as claimed in claim 5, wherein said at least one reversible dedicated drive motors includes three reversible dedicated drive motors, each drive motor respectively rotating said rotating element in said focal distance display unit, said stop value display unit, and said exposure correction value display unit, and said at least one drive motor includes one unidirectional stepping motor to rotate said rotating element in said frame number display unit in one direction, said detection means further detects an amount of rotation of said rotating setting dial, and said control means further controls said stepping motor to rotate said rotating element in said frame number display unit in a direction and an amount corresponding to said detected direction and amount of rotation of said rotating setting means, regardless of said direction of rotation of said rotating setting means.

8. The display apparatus as claimed in claim 1, wherein said direction of rotation of said rotating setting means includes a first direction and a second direction.

9. The display apparatus as claimed in claim 8, wherein said first direction is clockwise and said second direction is counterclockwise.

10. The display apparatus as claimed in claim 1, wherein said detection means includes switches for detecting a direction of rotation.

11. A display apparatus for displaying photographic information using rotating elements, comprising:

rotating setting means for rotatively setting photographic information while rotating in one of a first direction and a second direction;

display means, including at least one pointer scale and at least one pointer, for displaying the photographic information set by said rotating setting means, said at least one pointer scale including the photographic information and having a first index and a second index, said at least one pointer indicating the photographic information by pointing to the photographic information set by said rotating setting means, said at least one pointer rotating in said first direction of rotation above said at least one pointer scale;

detection means for detecting a direction of rotation of said rotating setting means;

drive means for rotating said at least one pointer in said first direction; and control means for controlling said drive means to rotate said at least one pointer in said first direction to point to said first index in said at least one pointer scale when said rotating setting means rotates in said first direction as detected by said detection means, and for controlling said drive means to rotate said at least one pointer in said first direction to point to said second index in said at least one pointer scale when said rotating setting means rotates in said second direction as detected by said detection means.

12. The display apparatus as claimed in claim 11, wherein said display means includes a frame number display unit and a self-timer display unit, said self-timer display unit including said first and second index, said first and second index being located on a frame number pointer scale in said frame number display unit, such that a frame number pointer rotates in said first direction above said frame number scale and points to photographic information in said frame number scale and also points to either said first or second index, depending on said detected direction of rotation of said rotating setting means.

13. The display apparatus as claimed in claim 12, wherein said drive means includes a unidirectional rotary stepping motor for driving said frame number pointer in said first direction.

14. The display apparatus as claimed in claim 11, wherein said drive means includes at least one unidirectional rotary stepping motor for driving said display means.

15. A display apparatus for displaying photographic information using rotating elements, comprising:

rotating setting means for rotatively setting photographic information while rotating in one of a first direction and a second direction;

display means, including at least one pointer scale and at least one pointer, for displaying the photographic information set by said rotating setting means, said at least one pointer scale including the photographic information, said at least one pointer indicating the photographic information by pointing to the photographic information set by said rotating setting means, said at least one pointer rotating in said first direction of rotation about said at least one pointer scale;

detection means for detecting an amount of rotation and a direction of rotation of said rotating setting means;

drive means for rotating said at least one pointer in said first direction; and control means for controlling said drive means to rotate said at least one pointer in said first direction to a position on said at least one pointer scale proportional to the amount of rotation and direction of rotation of said rotating setting means detected by said detection means when said rotating setting means rotates in said first direction, and for controlling said drive means to rotate said at least one pointer in said first direction to a position on said at least one pointer scale corresponding to the amount of rotation and direction of rotation of said rotating setting means in said second direction detected by said detection means when said rotating setting means rotates in said second direction.

16. The display apparatus as claimed in claim 15, wherein said detection means includes a pulse generator which generates pulses corresponding to the amount of rotation and direction of rotation.

17. The display apparatus as claimed in claim 15, wherein said display means includes a strobe mode display unit.

18. The display apparatus as claimed in claim 17, wherein said drive means includes a unidirectional rotary stepping motor for driving said strobe mode display unit.

19. The display apparatus as claimed in claim 15, wherein said drive means includes at least one unidirectional rotary stepping motor for driving said display means.

20. A display apparatus for displaying photographic information using rotating elements, comprising:

rotating setting means for rotatively setting photographic information while rotating in one of a first direction and a second direction;

first display means, including a first pointer and a first pointer scale, for displaying the photographic information set by said rotating setting means, said first pointer scale including the photographic information, said first pointer indicating the photographic information by pointing to the photographic information set by said rotating setting means, said first pointer rotating above said first pointer scale;

second display means, including a second pointer and a second pointer scale, for displaying the photographic information set by said rotating setting means, said second pointer scale including the photographic information, said second pointer indicating the photographic information by pointing to the photographic information set by said rotating setting means, said second pointer rotating above said second pointer scale;

drive means for rotating said first and second pointers;

a stop element, disposed at a predetermined position on said first pointer scale, which limits a rotation of said first pointer; and control means for controlling said drive means to initially rotate said first pointer to contact said stop element on said first pointer scale, then for controlling said drive means to initially rotate said second pointer to contact said first pointer, and then for setting a position of said initially rotated first pointer as a first standard position and for setting a position of said initially rotated second pointer as a second standard position.

21. The display apparatus as claimed in claim 20, wherein said drive means includes a first drive motor which is a reversible dedicated drive motor and a second drive motor which is a unidirectional stepping motor, said first drive motor rotating said first pointer and said second drive motor rotating said second pointer.

22. The display apparatus as claimed in claim 21, wherein said first display means is an exposure correction display unit and said second display means is a frame number display unit.

23. A display apparatus for displaying photographic information using rotating elements, comprising:

rotating setting means for rotatively setting photographic information;

first display means, including a first pointer and a first pointer scale, for displaying the photographic information set by said rotating setting means, said first pointer scale including the photographic information, said first pointer indicating the photographic information by pointing to the photographic information set by said rotating setting means, said first pointer rotating above said first pointer scale;

second display means, including a second pointer and a second pointer scale, for displaying the photographic information set by said rotating setting means, said second pointer scale including the photographic information, said second pointer indicating the photographic information by pointing to the photographic information set by said rotating setting means, said second pointer rotating above said second pointer scale, said second display means being disposed within said first display means and in a range of rotation of said first pointer;

drive means for rotating said first and second pointers in said first and second display means, respectively;

detection means for detecting when said first pointer overlaps said second display means; and control means for controlling said drive means to rotate said first pointer out of said range of said second display means when said rotating setting means sets the photographic information displayed in said second display unit and when said detection means detects that said first pointer overlaps said second display means, and then for controlling said drive means to rotate said first pointer back to its previous position after said rotating setting means sets the photographic information displayed in said second display means.

24. The display apparatus as claimed in claim 23, wherein said drive means includes a first drive motor and a second drive motor, said first drive motor rotates said first pointer, said second drive motor rotates said second pointer, said first drive motor is a reversible dedicated drive motor and said second drive motor is a unidirectional stepping motor.

25. The display apparatus as claimed in claim 24, wherein said first display means is a frame number display unit and said second display means is a strobe mode display unit.

26. The display apparatus as claimed in claim 23, wherein said control means controls said drive means to rotate said first pointer out of said range of said second display means with a minimum amount of movement.

27. The display apparatus as claimed in claim 23, wherein said control means controls said drive means to rotate said first pointer out of said range of said second display unit with a predetermined amount of movement and in a predetermined direction.

28. The display apparatus as claimed in claim 23, wherein said control means controls said drive means to rotate said first pointer out of said range of said second display unit to a position on said first pointer scale which does not indicate photographic information.

29. A display apparatus for displaying photographic information using rotating elements, comprising:

rotating setting means for rotatively setting photographic information;

display means, including at least one pointer scale and at least one pointer rotating above said at least one pointer scale, for displaying the photographic information set by said rotating setting means, said at least one pointer scale including the photographic information, said at least one pointer indicating the photographic information by pointing to the photographic information set by said rotating setting means;

drive means for rotating said at least one pointer;

a stop element disposed at a predetermined position on said at least one pointer scale, which limits a rotation of said at least one pointer;

integrating means for integrating a total amount of rotation of said at least one pointer from said stop element;

memory means for storing said integrated total amount of rotation;

display reset means for generating a display reset signal; and control means for controlling said drive means to rotate said at least one pointer in a first direction in accordance with said rotating setting means, and in response to said display reset signal, for controlling said drive means to rotate said at least one pointer in a second direction to said stop element and then in said first direction to a position on said at least one pointer scale corresponding to said integrated total amount of rotation stored in said memory means.

30. The display apparatus as claimed in claim 29, wherein said display reset means generates said display reset signal when a main switch in said camera is closed.

31. The display apparatus as claimed in claim 29, wherein said display reset means generates said display reset signal when a reset button in said camera is depressed.

32. The display apparatus as claimed in claim 29, wherein said display reset means generates said display reset signal when a back cover of said camera is closed.

33. The display apparatus as claimed in claim 29, wherein said display reset means generates said display reset signal when a battery compartment cover of said camera is closed.

34. A display apparatus for displaying information using rotating elements, comprising:

rotating setting means, being directly rotated by a user, for rotatively setting information;

display means, including at least one pointer scale and at least one pointer, for displaying the information set by said rotating setting means, said at least one pointer scale including the information, said at least one pointer indicating the information by pointing to the information set by said rotating setting means, one of said at least one pointer and said at least one pointer scale being fixed and the other rotating about said fixed one;

detection means for detecting a direction of rotation of said rotating setting means;

drive means for rotating a rotating element, said rotating element being one of said at least one pointer and said at least one pointer scale in said display means; and control means for controlling said drive means to rotate said rotating element in the same direction as said direction of said rotating setting means detected by said detection means.

35. The display apparatus as claimed in claim 34, wherein said drive means includes at least one reversible dedicated drive motor which can rotate said rotating element in both a clockwise direction and a counterclockwise direction, and includes at least one unidirectional rotary stepping motor which can rotate said rotating element in one of a clockwise and counterclockwise direction.

36. The display apparatus as claimed in claim 35, wherein said stepping motor rotates said rotating element in one of said clockwise and counterclockwise direction corresponding to a direction and an amount of rotation of said rotating setting means, regardless of said direction of rotation of said rotating setting means.

* * * * *

UNITED STATES PATENT AND TRADEMARK OFFICE
CERTIFICATE OF CORRECTION

PATENT NO. : 5,521,671
DATED : May 28, 1996
INVENTOR(S) : Hitoshi AOKI et al.

It is certified that error appears in the above-indentified patent and that said Letters Patent is hereby corrected as shown below:

TITLE PAGE [30] FOREIGN APPLICATION PRIORITY DATA

"Oct. 16, 1992 [JP]  Japan................4-287813" should be --Oct. 26, 1992 [JP]  Japan...............4-287813--.

Signed and Sealed this

Twenty-seventh Day of August, 1996

Attest:

BRUCE LEHMAN

*Attesting Officer*          *Commissioner of Patents and Trademarks*